US012663183B2

(12) United States Patent
Hiraoka

(10) Patent No.: US 12,663,183 B2
(45) Date of Patent: Jun. 23, 2026

(54) SYSTEM FOR ESTABLISHING WIRELESS PAIRING BETWEEN PLURALITY OF HOT WATER SUPPLY DEVICE OF HOT WATER SUPPLY SYSTEM

(71) Applicant: NORITZ CORPORATION, Hyogo (JP)

(72) Inventor: Kazuki Hiraoka, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 384 days.

(21) Appl. No.: 18/540,884

(22) Filed: Dec. 15, 2023

(65) Prior Publication Data

US 2025/0198658 A1     Jun. 19, 2025

(51) Int. Cl.
*F24H 15/464* (2022.01)
*H04W 12/50* (2021.01)
*H04W 12/55* (2021.01)
*H04W 60/04* (2009.01)

(52) U.S. Cl.
CPC .......... *F24H 15/464* (2022.01); *H04W 12/50* (2021.01); *H04W 12/55* (2021.01); *H04W 60/04* (2013.01)

(58) Field of Classification Search
CPC ..... F24H 15/464; H04W 12/50; H04W 12/55; H04W 60/04
See application file for complete search history.

(56) References Cited

U.S. PATENT DOCUMENTS

| | | | |
|---|---|---|---|
| 2014/0256260 | A1* | 9/2014 | Ueda ..................... H04W 76/14 |
| | | | 455/41.2 |
| 2017/0251427 | A1* | 8/2017 | Xu .......................... H04W 48/20 |
| 2020/0396680 | A1* | 12/2020 | Murali .............. H04W 52/0206 |
| 2021/0227605 | A1* | 7/2021 | York ..................... H04W 12/50 |
| 2022/0379199 | A1* | 12/2022 | Lea ........................... A63F 13/26 |
| 2024/0410623 | A1* | 12/2024 | Ashley .................... F24H 15/45 |

FOREIGN PATENT DOCUMENTS

| | | |
|---|---|---|
| JP | 2008275234 | 11/2008 |
| JP | 2012013376 | 1/2012 |
| JP | 6793879 | 12/2020 |
| JP | 2023122110 | 9/2023 |

* cited by examiner

*Primary Examiner* — Rami R Okasha
(74) *Attorney, Agent, or Firm* — JCIPRNET

(57) ABSTRACT

A hot water supply system includes a plurality of hot water supply devices. The plurality of hot water supply devices include a first hot water supply device having a first hot water supply wireless communication module and a second hot water supply device having a second hot water supply wireless communication module. The plurality of hot water supply devices communicate with each other by a daisy chain connection, wherein the daisy chain connection is a wireless connection. One hot water supply device among the plurality of hot water supply devices is configured to be paired with another hot water supply device among the plurality of hot water supply devices that is currently not paired with any of the plurality of hot water supply devices and has a highest received signal strength indicator value among the plurality of hot water supply devices.

8 Claims, 24 Drawing Sheets

Wireless Pairing Sequence (Side View) – 6 hot water supply devices

Wireless Pairing Sequence (Side View) – 6 hot water supply devices

Wireless Pairing Sequence (Side View) – 6 hot water supply devices

Wireless Pairing Sequence (Side View) – 6 hot water supply devices

Wireless Pairing Sequence (Top View) - 12 hot water supply devices

Wireless Pairing Sequence (Top View) - 12 hot water supply devices

Wireless Pairing Sequence (Top View) - 12 hot water supply devices

SYSTEM FOR ESTABLISHING WIRELESS PAIRING BETWEEN PLURALITY OF HOT WATER SUPPLY DEVICE OF HOT WATER SUPPLY SYSTEM

BACKGROUND

Technical Field

The disclosure relates to a hot water supply system, and more particularly relates to a system for establishing wireless pairing between a plurality of hot water supply devices of the hot water supply system.

Description of Related Art

Traditionally, in a hot water supply system, a plurality of hot water supply devices are disposed side by side and the plurality of hot water supply devices are connected together to function as the hot water supply system.

In the hot water supply system where the plurality of hot water supply devices communicate with each other by a wired connection, the connecting of a communication line (a wire/cable) between the plurality of hot water supply devices becomes time consuming as a number of the hot water supply devices increase.

Therefore, a hot water system in which the plurality of hot water supply devices communicate with each other wirelessly may be provided. However, when establishing the wireless connection between the plurality of hot water supply devices, there is a risk that the wireless connection may be made with a hot water supply device that is not part of the hot water supply system, or a hot water supply device of the hot water supply system may be accidently omitted.

Therefore, an easy way for establishing an accurate wireless connection between the plurality of hot water supply devices of the hot water supply system is needed.

SUMMARY

The disclosure provides a hot water supply system. The hot water supply system includes a plurality of hot water supply devices. The plurality of hot water supply devices include a first hot water supply device having a first hot water supply wireless communication module and a second hot water supply device having a second hot water supply wireless communication module. The plurality of hot water supply devices communicate with each other by a daisy chain connection, wherein the daisy chain connection is a wireless connection. One hot water supply device among the plurality of hot water supply devices is configured to be paired with another hot water supply device among the plurality of hot water supply devices that is currently not paired with any of the plurality of hot water supply devices and has a highest received signal strength indicator value among the plurality of hot water supply devices.

BRIEF DESCRIPTION OF THE DRAWINGS

Embodiments will now be described, by way of example only, with reference to the accompanying drawings which are meant to be exemplary, not limiting, and wherein like elements are numbered alike in several Figures. Similar components are denoted by the same reference numerals, and descriptions thereof are omitted.

DESCRIPTION OF THE EMBODIMENTS

Figure 1:
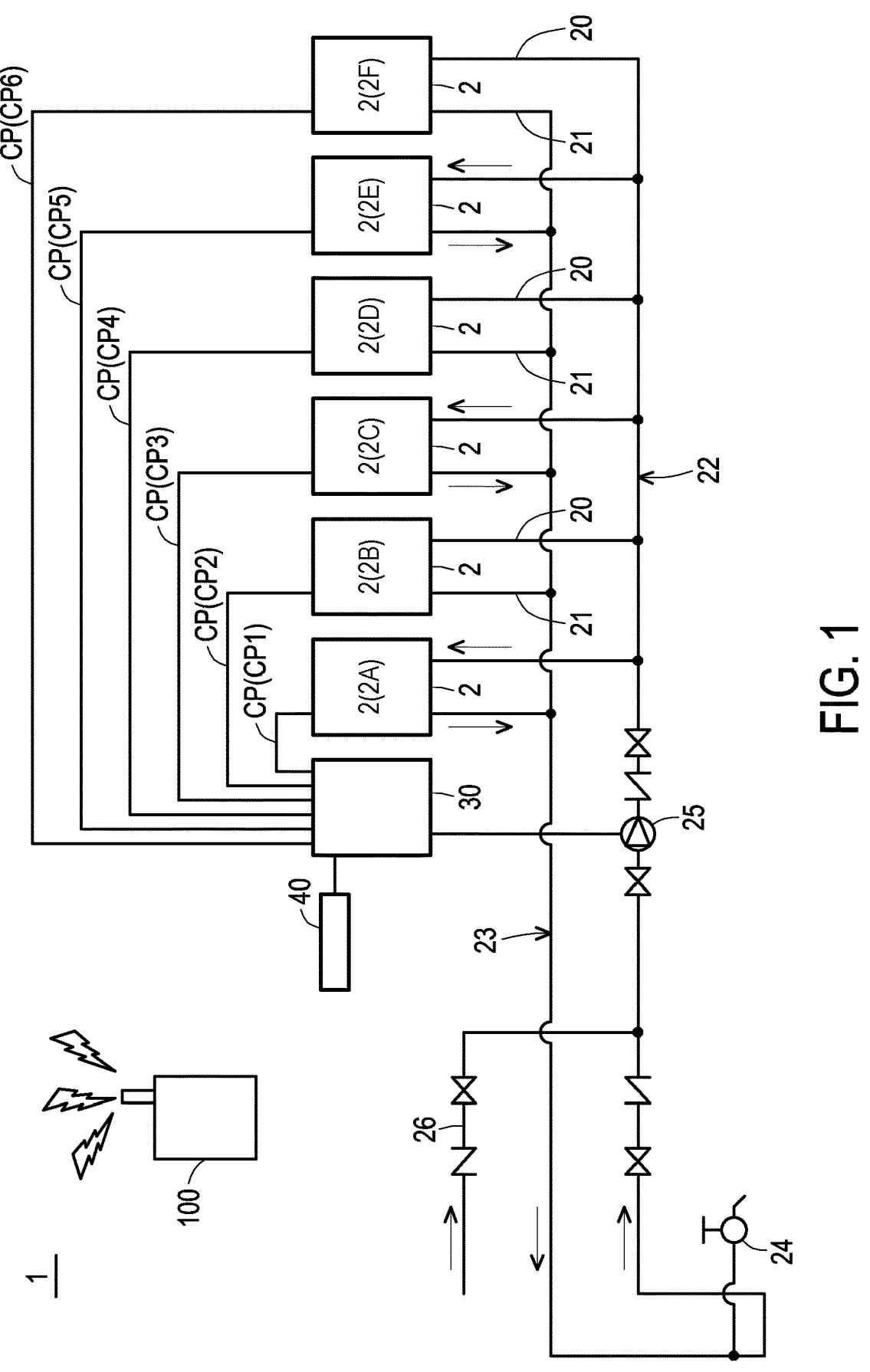
FIG. 1 is a schematic diagram illustrating a hot water supply system having a star connection according to an embodiment of the disclosure.

FIG. 1 is a schematic diagram illustrating a hot water supply system having a star connection according to an embodiment of the disclosure. Referring to FIG. 1, a hot water supply system 1 is provided. The hot water supply system 1 may be disposed, for example, on a building, inside a building, on a roof of the building, and/or the like. The hot water supply system 1 may be used, for example, to provide heated water to a shower(s) of a gym, to provide heated drinking water for a building and/or the like. However, the disclosure is not limited thereto, and the hot water supply system 1 may be disposed at other locations, and/or provided for other purposes according to requirements.

Referring to FIG. 1, the hot water supply system 1 includes a plurality of hot water supply devices 2. More specifically, the hot water supply system 1 of the present embodiment includes six hot water supply devices 2, namely a first hot water supply device 2A, a second hot water supply device, 2B, a third hot water supply device 2C, a fourth hot water supply device 2D, a fifth hot water supply device 2E, and a sixth hot water supply device 2F. A number of the hot water supply devices 2 is not limited thereto, and the number of the hot water supply devices 2 of the hot water supply system 1 may be set according to requirements. For example, the number of the hot water supply devices 2 may be 10, 18, 24 hot water supply devices 2. A numbering of the plurality of hot water supply devices such as first hot water supply device, second third hot water supply device, third hot water supply device, fourth hot water supply device, fifth hot water supply device, sixth hot water supply device and the like is merely to differentiate between the plurality of hot water supply devices for explanation purposes only and is not intended to limit the disclosure. That is to say, the numbering of the hot water supply devices may be changed, switched, altered, and/or omitted.

Referring to FIG. 1, the hot water supply system 1 includes a system controller 30 that controls a connection and/or communication to each of the hot water supply devices 2. Each of the plurality of hot water supply devices 2 is (wired or wirelessly) connected to the system controller 30 such that the plurality of hot water supply devices 2 may communicate with each other.

A remote control 40 may be provided for a user to command tasks, such as commanding the hot water supply system 1 to operate (for example, turn ON/turn OFF the hot water supply system 1), and/or setting a temperature of the water that is to be supplied by the hot water supply system 1. The remote control 40 may include, for example, a display 41, a button(s), a touch screen display and/or the like. The remote control 40 may be wired or wireless remote control that is connected to the system controller 30.

Referring to FIG. 1, a water input and a water output of the six hot water supply devices 2 are arranged in parallel. More specifically, the hot water supply system 1 includes six inlet pipes 20 and six outlet pipes 21 which connect the six hot water supply devices 2 in parallel. The six inlet pipes 20 are connected to a water supply pipe 22, which in turn is connected to a water supply system 26. The water supplied to the water supply pipe 22 by the water supply system 26 is then supplied to each of the six the hot water supply devices 2 via their respective inlet pipes 20.

Referring to FIG. 1, the water that is supplied to the hot water supply device 2 is outputted from the outlet pipe 21. In the present embodiment, six outlet pipes 21 are all connected to a hot water pipe 23, and hot water heated by each hot water supply device 2 is outputted to the hot water pipe 23 via their respective outlet pipes 21. The hot water pipe 23 is connected to a hot water tap 24 such as a spigot or shower, wherein hot water is discharged from the hot water tap 24. A number of the hot water tap 24 is not intended to limit the disclosure, and may be set according to requirements. The water supply pipe 22 is provided with a pump 25 for circulating the water. The pump 25 operates to cause water and hot water to circulate and flow from the water supply pipe 22 to the six inlet pipes 20. The pump 25 includes, for example, a motor that drives the pump 25.

Figure 2:
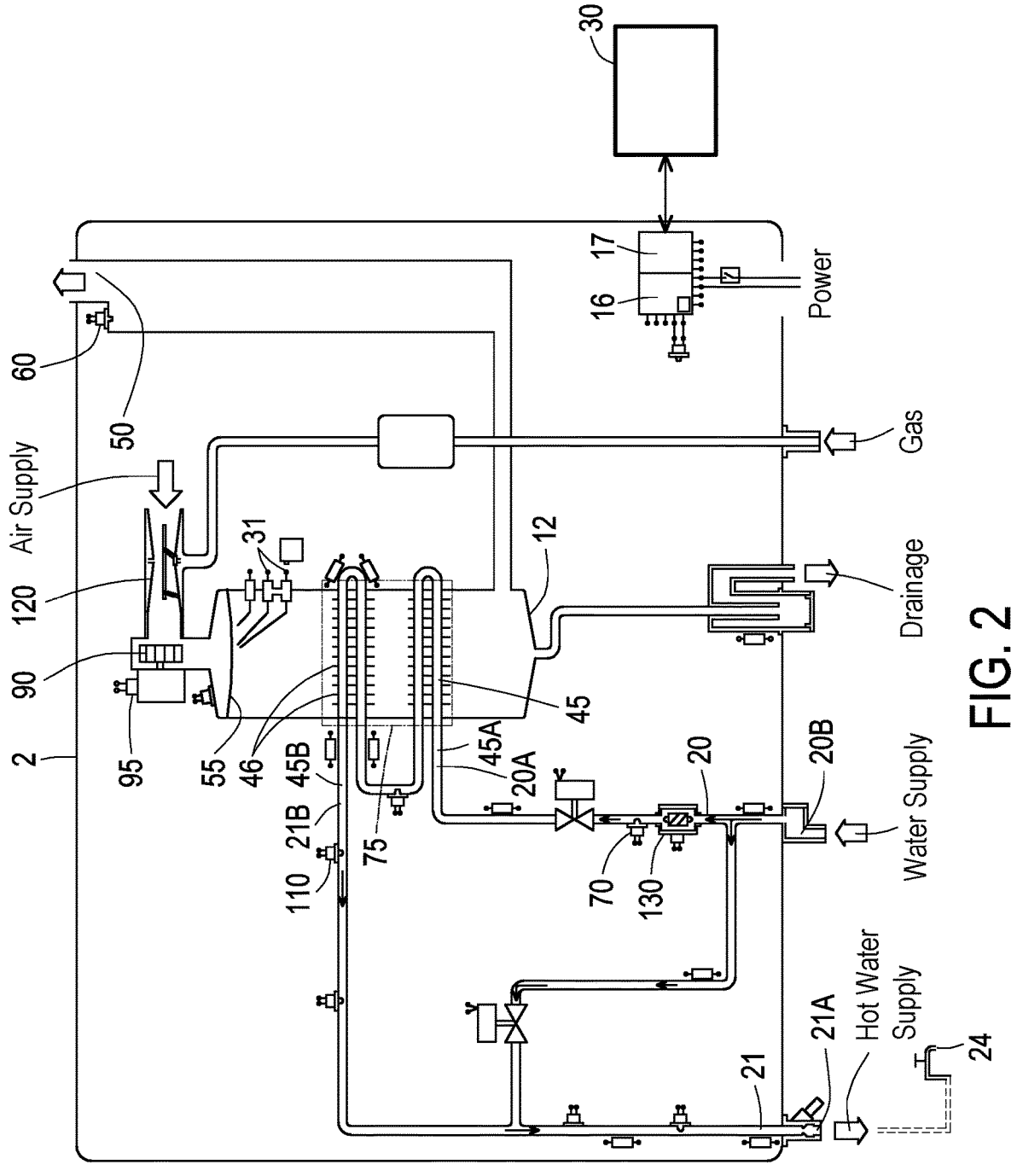
FIG. 2 is a schematic diagram illustrating a hot water supply device according to an embodiment of the disclosure.

FIG. 2 is a schematic diagram illustrating a hot water supply device according to an embodiment of the disclosure. Referring to FIG. 2, the hot water supply device 2 is adapted to generate hot water through heat exchange. The hot water supply device 2 includes the inlet pipe 20, the outlet pipe 21, a combustion unit 12, a burner unit 55, a heat exchanger 75, an exhaust aperture 50, a first temperature sensor 60, a second temperature sensor 70, a control unit (C/U) 16, a wireless communication module 17, a fan 90, a rotation speed sensor 95, and a venturi mixer 120. Each hot water supply device 2 may also include an operation panel 15, electrically coupled to the control unit 16, the operation panel 15 including, for example, a display, touch display, and/or a button. In the present embodiment, a material of the inlet pipe 20 and the outlet pipe 21 are, for example, copper. However, the disclosure is not limited thereto, and the inlet pipe 20 and the outlet pipe 21 may be made of other material. The hot water supply device 2 may include a power supply part, comprising a switch configured to turn on and off power to the wireless communication module 17. The hot water supply device 2 may be configured to turn on power to their respective wireless communication module 17 via the switch when there is a need to perform wireless communication using their respective wireless communication module 17, and turn off power to their respective wireless communication module 17 via the switch when there is no need to perform wireless communication using their respective wireless communication module 17. In this way, power may be saved when the wireless communication module 17 is not in use, and/or when their respective wireless communication module 17 is not needed at the present time to perform wireless communication.

Referring to FIG. 2, the hot water supply device 2 described is configured to heat water by burning fuel gas, however the disclosure is not limited thereto. In another embodiment of the disclosure, the hot water supply device 2 may be configured to heat the water using electricity instead of gas. In another embodiment of the disclosure, the hot water supply system 1 may include a combination of both, wherein some hot water supply devices 2 heat water by gas, while some hot water supply devices 2 heat water by electricity.

Referring to FIG. 2, the control unit (C/U) 16 may include, for example, a processor. The wireless communication module 17 may include, for example, a transceiver and a receiver including an antenna(s). The wireless communication module 17 may be used to wirelessly communicate with another wireless communication module 17 of another hot water supply device 2, and/or wirelessly communicate with a mobile terminal 1. The mobile terminal 1 may include a processor, a display, and a wireless communication module for wirelessly communicating with the hot water supply devices 2 having the wireless communication module 17. The mobile terminal 1, may be for example a handheld device, a tablet PC, a smart phone and/or the like. However the disclosure is not limited thereto. The wireless communication module 17 may allow for wireless communication by, for example, Bluetooth. However, the wireless communication is not limited to Bluetooth, and a type of wireless communication(s) may be set according to requirements.

Referring to FIG. 1, in the present embodiment, all of the plurality of hot water supply devices 2 include the wireless communication module 17. However, the disclosure is not limited thereto. In another embodiment of the disclosure, none of the plurality of hot water supply devices 2 may include the wireless communication module 17. In another embodiment of the disclosure, some of the hot water supply devices 2 may include the wireless communication module 17, while some hot water supply devices 2 may not include the wireless communication module 17. The configuration for each hot water supply device 2, whether to include or not include the wireless communication module 17, may be set according to requirements, and is not intended to limit the disclosure.

Referring to FIG. 2, the burner unit 55 is disposed in the combustion unit 12. The combustion unit 12 mixes together fuel gas supplied from a fuel supply conduit (not shown in the figures) and air for combustion supplied by a fan 90, and combusts the resulting mixture. The rotation speed sensor 95 detects a rotation speed of the fan 90. The burner unit 55 includes a spark plug 31 for igniting the fuel-air mixture gases supplied from the burner unit 55 by generating an ignition spark between itself and an ignition target provided in the burner unit 55.

The heat exchanger 75 is, for example, a fin and tube type heat exchanger, and includes a heat exchange tubing 45 and a plurality of fins 46 that are fixed to the heat exchange tubing 45 so as to be capable of heat transfer. The heat exchanger 75 is connected between the inlet pipe 20 and the outlet pipe 21. In the present embodiment, one end 45A of the heat exchange tubing 45 connects with one end 20A of the inlet pipe 20, and an other end 45B of the heat exchange tubing 45 connects with an other end 21B of the outlet pipe 21.

Water enters the hot water supply device 2 from an other end 20B of the inlet pipe 20, the water is heated by the heat exchanger 75, and then exits from a one end 21A of the outlet pipe 21. The burner unit 55 of the hot water supply device 2 combusts fuel gas to generate heat. The heat exchanger 75 exchanges heat between the fuel gas combusted by the burner unit 55 and the water passing through the heat exchanger 75.

The combusted fuel gas is turned into exhaust gas after heat exchange is completed by the heat exchanger 75. The exhaust aperture 50 discharges exhaust gas after heat exchange by the heat exchanger 75. The first temperature sensor 60 is disposed at the exhaust aperture 50 and detects a measured exhaust temperature of the exhaust gas. In the present embodiment, the first temperature sensor 60 is, for example, a thermistor. However, the disclosure is not limited thereto and other temperature sensors such as a thermocouple and the like may be used. In the present embodiment, a material of the exhaust aperture 50 is, for example, PVC plastic. However, the disclosure is not limited thereto, and the exhaust aperture 50 may be made of other material.

The second temperature sensor 70 is disposed at the inlet pipe 20 and detects a water temperature of the water entering the inlet pipe 20. In the present embodiment, the second temperature sensor 70 is, for example, a thermistor. In other embodiments, the second temperature sensor 70 may be a thermocouple. However, the disclosure is not limited thereto and other temperature sensors may be used.

Figure 3:
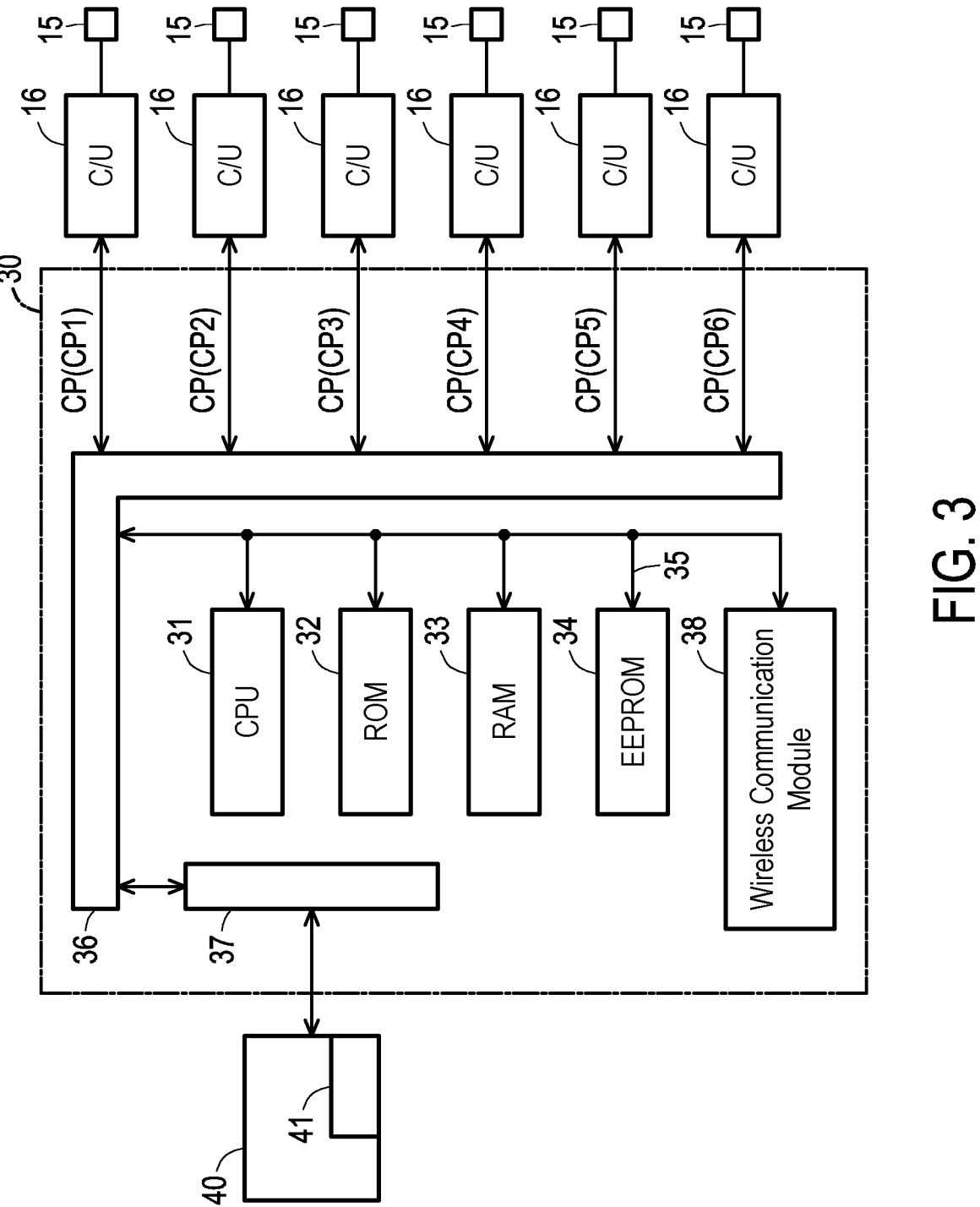
FIG. 3 is a schematic diagram illustrating a system controller of a hot water supply system having a star connection according to an embodiment of the disclosure.

FIG. 3 is a schematic diagram illustrating a system controller of a hot water supply system having a star connection according to an embodiment of the disclosure. Referring to FIG. 3, the system controller 30 directly communicates with the control units 16 of each of the plurality of hot water supply devices 2. The system controller 30 may include, for example, a CPU 31, a ROM 32, a RAM 33, an EEPROM 32 (nonvolatile memory), and a bus 35 connecting them. The system controller 30 may also include an input/output interface 36 such as a touch screen (or a display for outputting to a user and buttons for input by the user) for inputting by the user and outputting to the user to and from the system controller 30, and a communication interface 37 for transmitting/receiving to/from the remote control 40. The system controller 30 may also include a wireless communication module 38. The control units 16 of each of the six hot water supply devices 2 are connected to the input/output interface 36, respectively, so that the system controller 30 and the control units 16 of the six water heaters 2 can transmit and receive signals to and from each other. The ROM 32 may store a control program for operation control of the hot water supply system 1. The system controller 30 is an example of a communication relay apparatus of the disclosure.

The configuration of FIG. 1 and FIG. 3 illustrate a hot water supply system 1 having a star connection. The star connection is where the plurality of hot water supply devices 2 communicate in parallel with respect to each other. In more detail, each of the plurality of hot water supply devices 2 first communicate with the system controller 30 via a communication path CP, prior to communicating with another hot water supply device 2. For example, the first hot water supply device 2A communicates to the system controller 30 via a first communication path CP1. The second hot water supply device 2B communicates to the system controller 30 via a second communication path CP2. The third hot water supply device 2C communicates to the system controller 30 via a third communication path CP3. The fourth hot water supply device 2D communicates to the system controller 30 via a fourth communication path CP4. The fifth hot water supply device 2E communicates to the system controller 30 via a fifth communication path CP5. The sixth hot water supply device 2E communicates to the system controller 30 via a sixth communication path CP6.

Referring to FIG. 1 and FIG. 3, each of the plurality of communication paths CP (CP1, CP2, CP3, CP4, CP5, CP6) may be realized by a wired connection or a wireless connection. For example, all of the plurality of hot water supply devices 2 may communicate with the system controller 30 via their respective communication path CP that is a wire (the wire may include, for example, a cable), or all of the plurality of hot water supply devices 2 may communicate with the system controller 30 via their respective communication path CP without a wire (for example, wirelessly). In another example of the disclosure, the plurality of communication paths CP may include both a wired connection and a wireless connection, wherein some hot water supply devices 2 communicate with the system controller 30 via the communication path CP including a wire, and some hot water supply devices 2 communicate with the system controller 30 via the communication path CP without a wire. FIG. 1, illustrates an example embodiment where all of the plurality of hot water supply devices 2 communicate with the system controller 30 by a wire (illustrated by solid line of the communication path CP). Alternatively, FIG. 4 is a schematic diagram illustrating an example where a plurality of hot water supply devices 2 communicate with the system controller 30 wirelessly (illustrated by broken line of the communication path CP).

Figure 4:
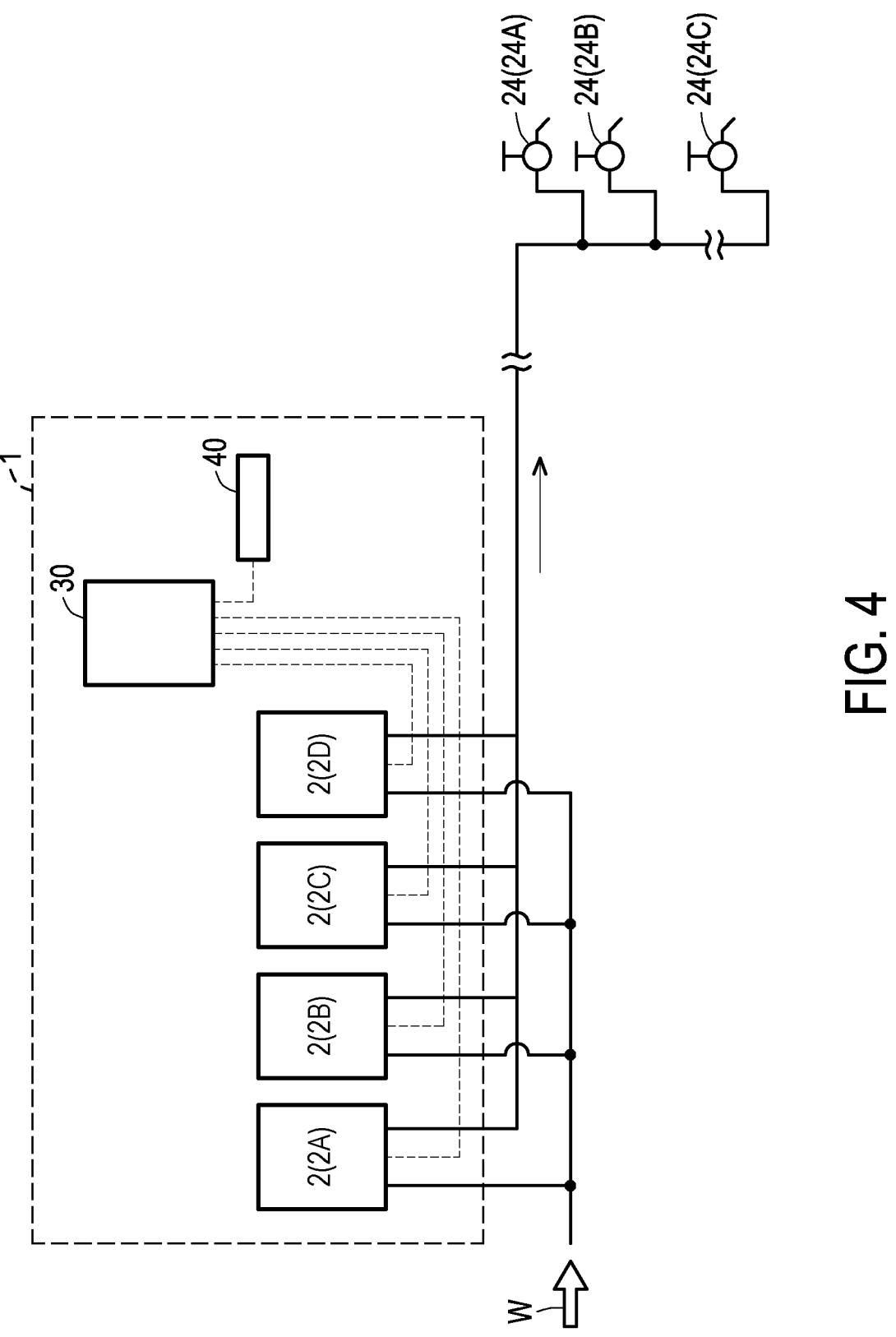
FIG. 4 is a schematic diagram illustrating a hot water supply system having a star connection wherein a plurality of hot water supply devices communicate with a system controller wirelessly according to an embodiment of the disclosure.

In the example embodiments illustrated in FIG. 1 and FIG. 4, the system controller 30 is shown to be disposed external to each of the plurality of hot water supply devices 2. However, the disclosure is not limited thereto. In another embodiment of the disclosure, the system controller 30 may be included in one of the plurality of hot water supply devices 2 such as shown in FIG. 5.

Figure 5:
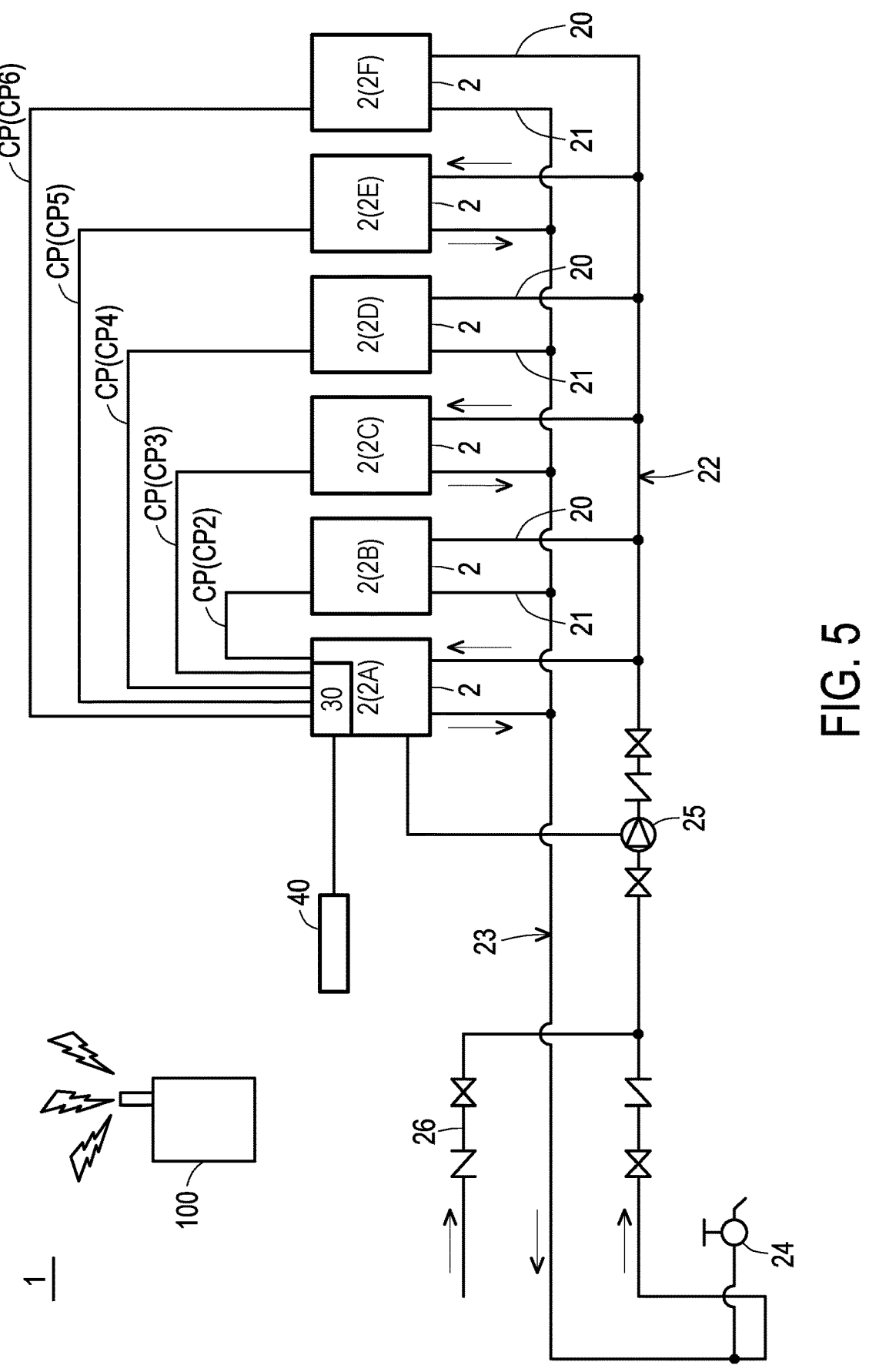
FIG. 5 is a schematic diagram illustrating a hot water supply system in which one of the plurality of hot water supply devices includes a system controller according to an embodiment of the disclosure.

FIG. 5 is a schematic diagram illustrating a hot water supply system wherein one of the plurality of hot water supply devices includes the system controller according to an embodiment of the disclosure. Referring to FIG. 5, the system controller 30 is included in the first hot water supply device 2A, wherein the other plurality of hot water supply devices 2B~2F communicate with the system controller 30 that is built-in to the hot water supply devices 2A. However, the disclosure is not limited thereto. In another embodiment of the disclosure, instead of being included in the first hot water supply device 2A, the system controller 30 may be included in one of the second hot water supply device, 2B, the third hot water supply device 2C, the fourth hot water supply device 2D, the fifth hot water supply device 2E, or the sixth hot water supply device 2F. In addition, the system controller 30 may be built-in to one the first hot water supply device 2A, the second hot water supply device, 2B, the third hot water supply device 2C, the fourth hot water supply device 2D, the fifth hot water supply device 2E, or the sixth hot water supply device 2F.

Referring to FIG. 5, in a case where the system controller 30 is included in one of the hot water supply devices 2 (in embodiment of FIG. 5 the system controller 30 is included in the first hot water supply devices 2A), the first hot water supply device 2A and the system controller 30 may share same components according to requirements. For example, the hot water supply device 2A and the system controller 30 may share a same (single) processor according to requirements. In addition, for example, the hot water supply device 2A and the system controller 30 may share a same (single)

wireless communication module according to requirements. However, in another embodiment of the disclosure, the hot water supply device 2A and the system controller 30 may have separate processors and/or separate wireless communication modules.

Figure 6:
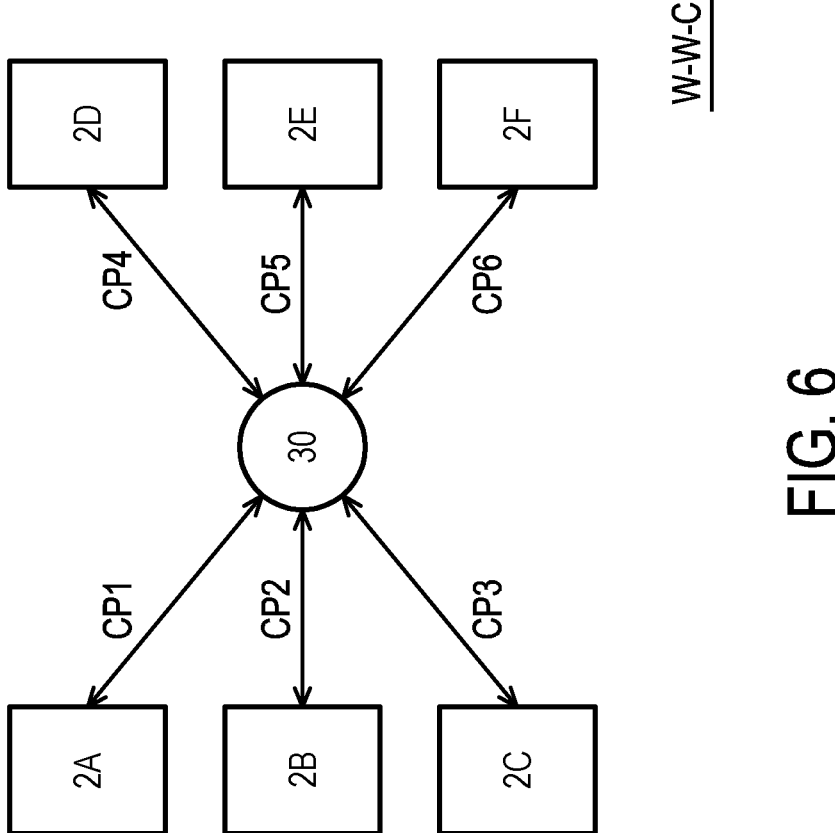
FIG. 6 is a schematic diagram illustrating a water-supply-to-water-supply-communication-path according to an embodiment of the disclosure.

FIG. 6 is a schematic diagram illustrating a water-supply-to-water-supply-communication-path according to an embodiment of the disclosure. Referring to FIG. 6, the plurality of hot water supply device 2 are configured to communicate with each other via a water-supply-to-water-supply-communication-path W-W-CP. That is to say, the water-supply-to-water-supply-communication-path W-W-CP allows the plurality of hot water supply devices 2 to communicate with each other. The water-supply-to-water-supply-communication-path W-W-CP is configured by the plurality of communication paths CP. In the present embodiment, the water-supply-to-water-supply-communication-path W-W-CP is configured by the first communication path CP1, the second communication path CP2, the third communication path CP3, the fourth communication path CP4, the fifth communication path CP5, and the sixth communication path CP6. In this way, any hot water supply device 2 may communicate with any other hot water supply device 2 by using a combination of the communication paths CP.

Figure 7:
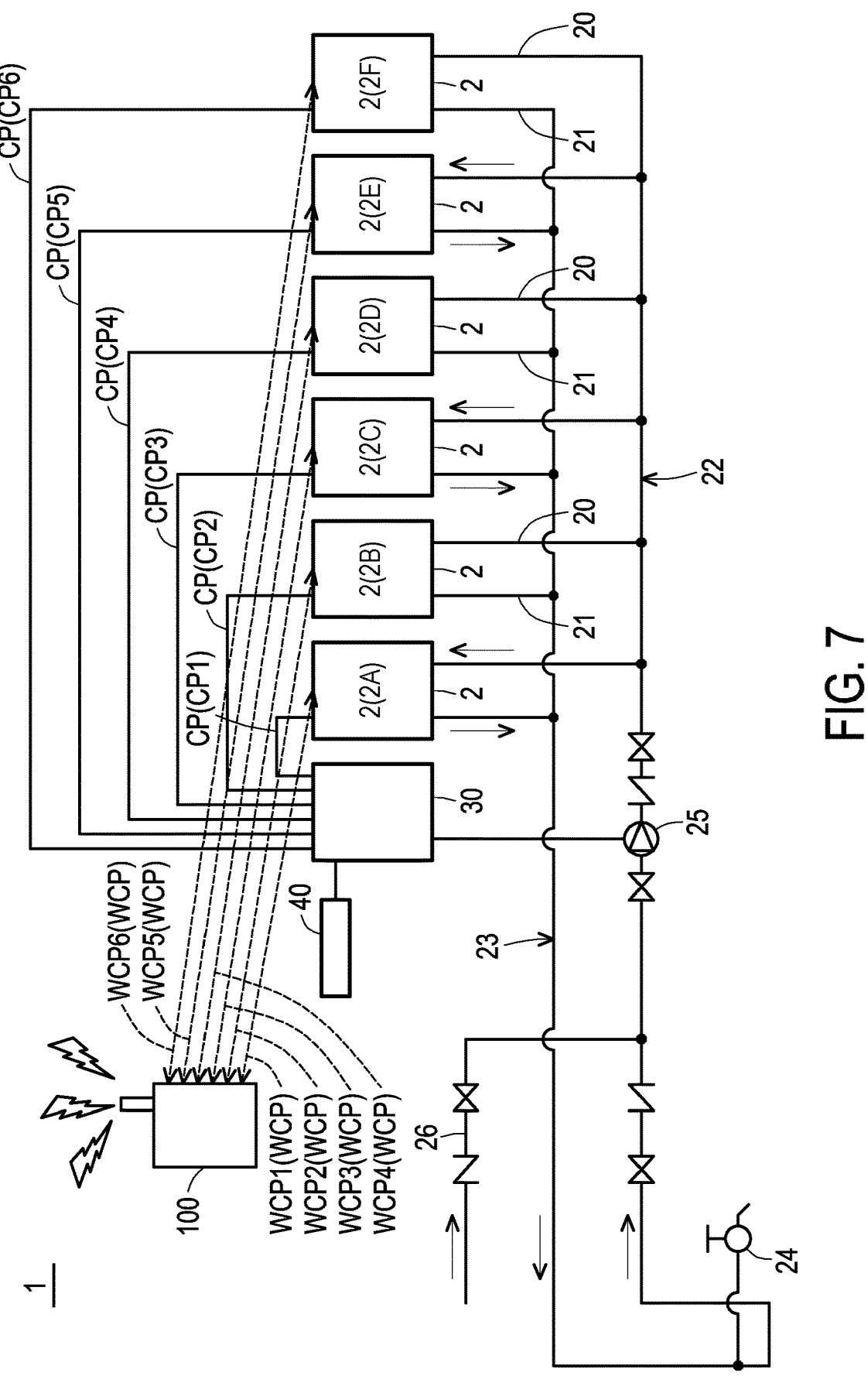
FIG. 7 is a schematic diagram illustrating a pairing process between a mobile terminal and a hot water supply system according to an embodiment of the disclosure.

FIG. 7 is a schematic diagram illustrating a pairing process between a mobile terminal and a hot water supply system according to an embodiment of the disclosure. Referring to FIG. 7, the mobile terminal 100 is configured to be paired with any one of the plurality of hot water supply devices 2 using a factory-set password to establish a first wireless communication path WCP1 between the one hot water supply devices 2 and the mobile terminal 100. In more detail, the mobile terminal 100 displays on the display, a list of the plurality of hot water supply devices 2 which are available for wireless pairing with the mobile terminal 100. The maintenance/installation personnel may select one of the plurality of hot water supply devices 2 from the list displayed on the mobile terminal 100 and enter the factory-set password to establish a first wireless communication path WCP1.

After one of the plurality of hot water supply devices 2 is paired with the mobile terminal 100 using the factory-set password, the one of the plurality of hot water supply devices 2 is configured to receive a one-time password from the mobile terminal 100 via the first wireless communication path WCP1. Then, the one of the plurality of hot water supply devices 2 is configured to send the one-time password to other hot water supply devices 2 among the plurality of hot water supply devices 2.

Referring to FIG. 7, the first hot water supply device 2A is illustrated as the one hot water supply devices 2 that is paired with the mobile terminal 100 to establish the first wireless communication path WCP1 between the first hot water supply device 2A and the mobile terminal 100. However, the disclosure is not limited thereto. In other embodiments of the disclosure, any of the hot water supply devices 2B~2F may be the one hot water supply device 2 that is paired with the mobile terminal 100 to establish the first wireless communication path WCP1.

It should be noted, each of the plurality of hot water supply devices 2 has a factory-set password for wireless pairing. The factory-set password for each hot water supply device 2 may be provided or displayed on, for example, a casing of the respective hot water supply device 2. In the present embodiment, the factory-set password for each hot water supply device 2 is different, and the factory-set password may include, for example, a serial number of the respective hot water supply device 2. However, the disclosure is note limited thereto, and in another embodiment of the disclosure, some or all of the plurality of hot water supply device 2 may have the same factory-set password for wireless pairing.

Referring to FIG. 7, at a time the first wireless communication path WCP1 is established, the mobile terminal 100 is paired with only the one hot water supply device 2A, and the mobile terminal 100 is not yet paired with the other hot water supply devices 2B~2F. After the first hot water supply device 2A is paired with the mobile terminal 100, the mobile terminal 100 is configured to send a one-time password to the first hot water supply device 2A via the first wireless communication path WCP1. In the present embodiment, the user of the mobile terminal 100 is prompted whether to send the one-time password. However, in another embodiment of the disclosure, the one-time password may be automatically sent by the mobile terminal 100 after the first wireless communication path WCP1 is established.

Then, the first hot water supply device 2A is configured to receive the one time password from the mobile terminal 100 via the first wireless communication path WCP1. Next, the first hot water supply device 2A is configured to automatically send the one time password to the other hot water supply devices 2B~2F, via the water-supply-to-water-supply-communication-path W-W-CP configured by the combination of the communication paths CP explained in FIG. 6. The water-supply-to-water-supply-communication-path W-W-CP may include wireless and/or wired communication paths CP.

Referring to FIG. 7, after the one-time password is received by the other hot water supply devices 2B~2F via the water-supply-to-water-supply-communication-path W-W-CP, the other hot water supply devices 2B~2F are configured to accept the one-time password as a valid password for wireless pairing. In other words, the control unit 16 of each of the plurality of hot water supply devices 2 is configured to accept the one-time password as a valid password for wireless pairing. In this way, the other hot water supply devices 2B~2F are configured to be automatically paired with the mobile terminal 100 using the one-time password to establish wireless communication with the mobile terminal 100, without requiring a user to manually input the factory-set password. For example, the second hot water supply devices 2B is paired with the mobile terminal 100 using the one-time password to establish a second wireless communication path WCP2 between the second hot water supply device 2B and the mobile terminal 101; the third hot water supply devices 2C is paired with the mobile terminal 100 using the one-time password to establish a third wireless communication path WCP3 between the third hot water supply device 2B and the mobile terminal 101; the fourth hot water supply devices 2D is paired with the mobile terminal 100 using the one-time password to establish a fourth wireless communication path WCP4 between the fourth hot water supply device 2D and the mobile terminal 101; the fifth hot water supply devices 2E is paired with the mobile terminal 100 using the one-time password to establish a fifth wireless communication path WCP5 between the fifth hot water supply device 2E and the mobile terminal 101; the sixth hot water supply devices 2F is paired with the mobile terminal 100 using the one-time password to establish a sixth wireless communication path WCP6 between the sixth hot water supply device 2F and the mobile terminal 101.

In this way, after the one-time password is sent to the plurality of hot water supply devices 2, then the mobile terminal 100 may automatically execute pairing with each of the other plurality of hot water supply devices 2 by using the same one-time password. More specifically, the mobile terminal 100 may automatically execute pairing with each of the other plurality of hot water supply devices 2 without a need to manually pair the mobile terminal 100 with each of the plurality of hot water supply devices 100 using their respective factory-set password. In this way, a different factory-set password does not need to be manually inputted individually by the user for each hot water supply device 2 which is to be paired with the mobile terminal 100.

In an embodiment of the disclosure, the one-time password may be valid for a predetermined period of time. And the one-time password becomes invalid when the predetermined period of time has passed. The pre-determined period of time may be, for example, 5 minutes, 10 minutes, 1 hour, 2 hours, and the like. The pre-determined period of time is not intended to limit the disclosure, and may be set according to requirements.

Referring to FIG. 7, after the mobile terminal 100 is successfully paired with all of the plurality of hot water supply devices 2, then the mobile terminal 100 may communicate (for example, send and/or receive data) with all of the plurality of hot water supply devices 2, or communicate (for example, send and/or receive data) with a specific hot water supply device 2. In addition, the mobile terminal 100 may command all of the plurality of hot water supply devices 2 or a specific hot water supply device 2 to perform a predetermined task/operation, such as for initialization and/or maintenance. The hot water supply device(s) 2 to be command by the mobile terminal 100, and/or the hot water supply device(s) 2 which the mobile terminal 100 is intended to communicate with may be selected by the user using the user interface of the mobile terminal 100. In an embodiment of the disclosure, the mobile terminal 100 may be configured to communicate with and/or control all or some of the plurality of hot water supply devices 2 at the same time, wherein the all or some of the plurality of hot water supply devices 2 communicating with the mobile terminal 100 are configured to display on a display part of the hot water supply device 2 an indicator indicating that communication is in progress with the mobile terminal 100. In another embodiment of the disclosure, the mobile terminal 100 may be configured to communicate with and/or control only one hot water supply device 2 at a single time instance, wherein the only one hot water supply device 2 communicating with the mobile terminal 100 is configured to display on a display part of the one hot water supply device 2 an indicator indicating that communication is in progress with the mobile terminal 100. The display part of the hot water supply device 2 may include, for example, a display or a light, wherein the hot water supply device 2 that is/are currently communicating with the mobile terminal 100 has the light turned ON, or the display displaying a light or message indicating communication is in progress with the mobile terminal 100. The light may be, for example, a light bulb or an LED. In another embodiment, the indicator may be a sound. In this way, installation/maintenance personnel may easily identify the hot water supply device 2 (or hot water supply devices 2) which is/are currently communicating and/or being commanded by the mobile terminal 100.

Figure 8:
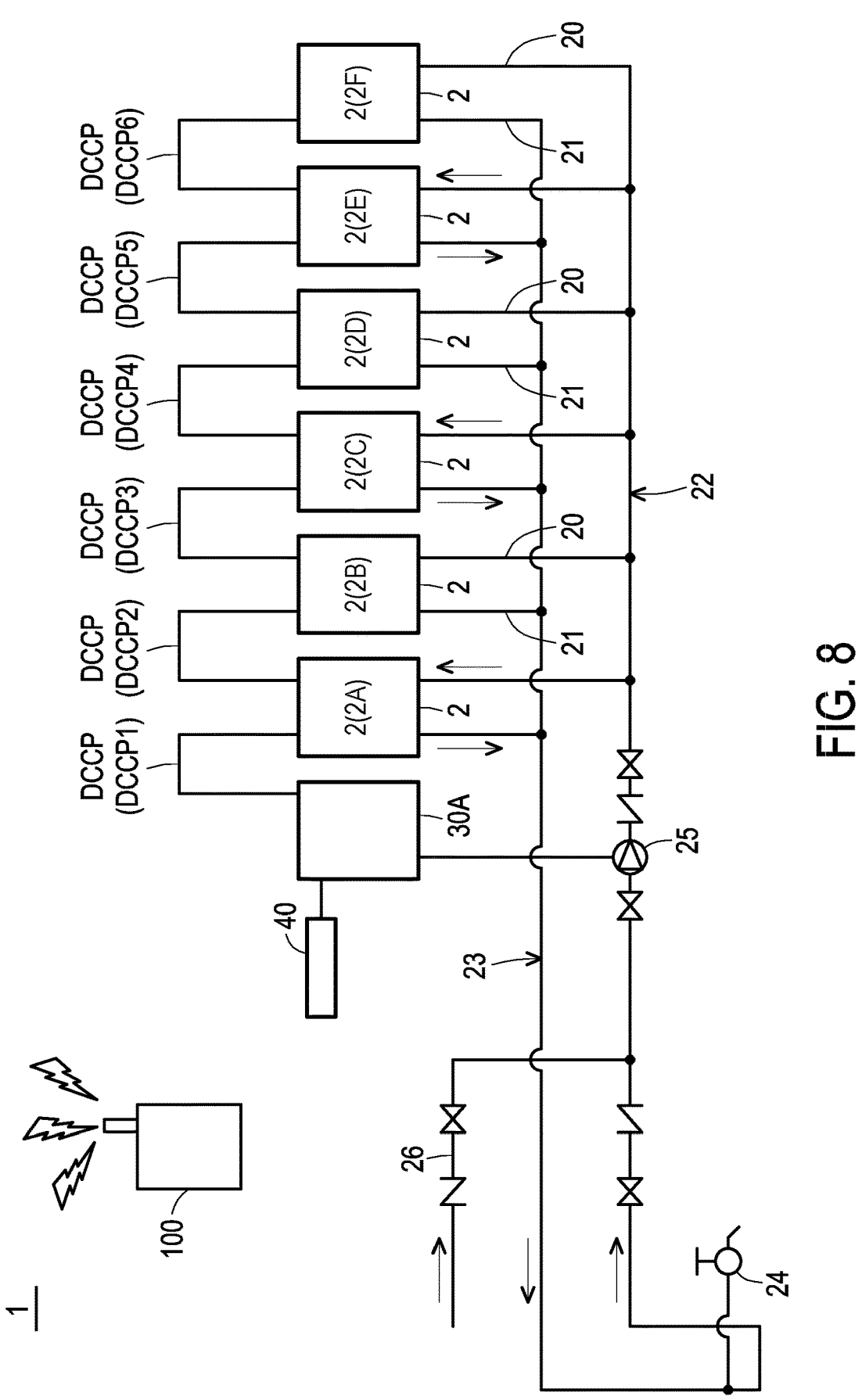
FIG. 8 is a schematic diagram illustrating a hot water supply system having a daisy chain connection according to an embodiment of the disclosure.
Figure 9:
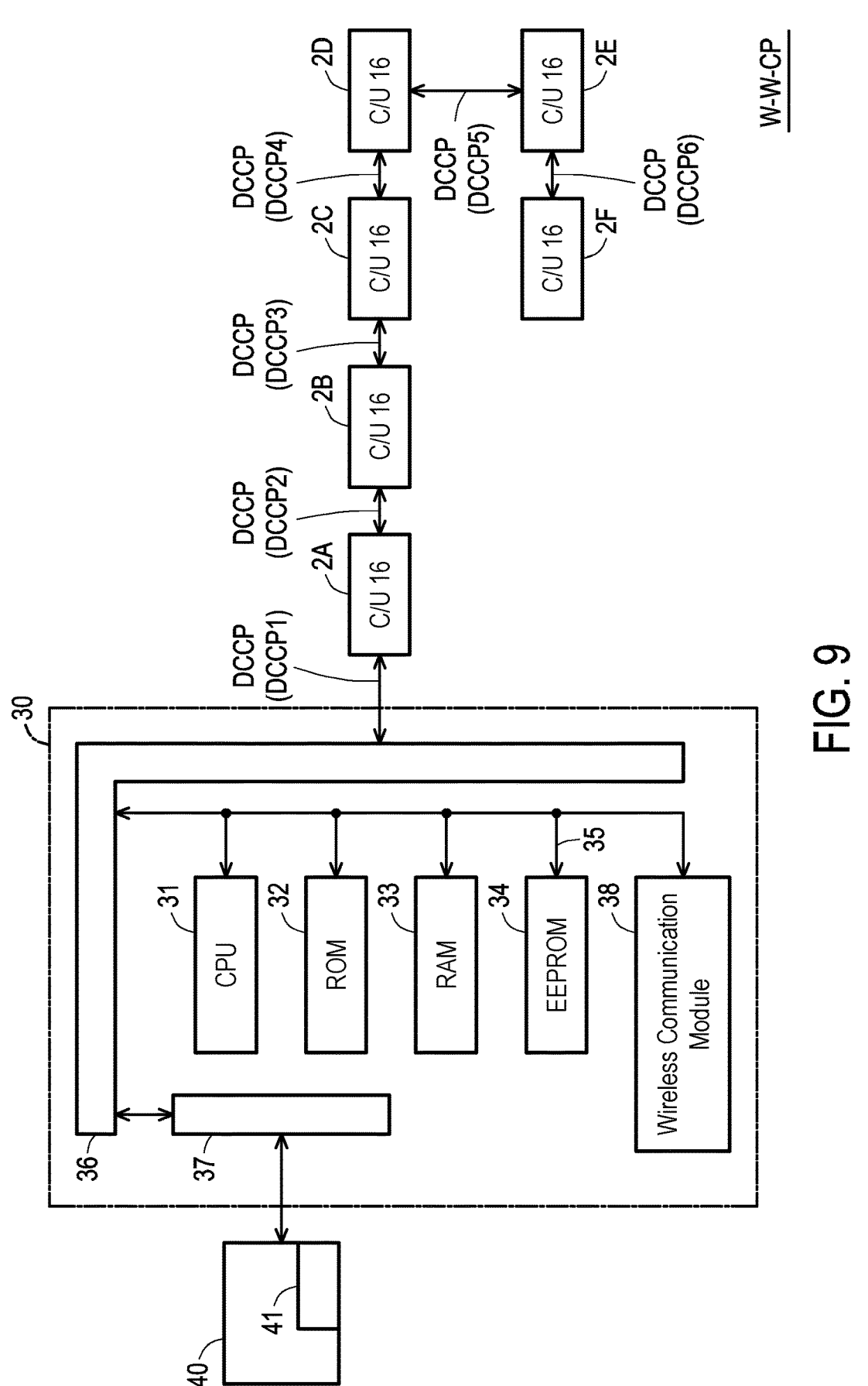
FIG. 9 is a schematic diagram illustrating a system controller of a hot water supply system having a daisy chain connection according to an embodiment of the disclosure.

FIG. 8 is a schematic diagram illustrating a hot water supply system having a daisy chain connection according to an embodiment of the disclosure. FIG. 9 is a schematic diagram illustrating a system controller of a hot water supply system having a daisy chain connection according to an embodiment of the disclosure. A difference between the star connection shown in FIG. 1 and FIG. 3, and the daisy chain connection shown in FIG. 8 and FIG. 9 is that, in the star connection the plurality of hot water supply devices 2 communicate with each other in parallel, where as in the daisy chain connection the plurality of hot water supply devices 2 communicate with each other in series.

Referring to FIG. 8 and FIG. 9, the daisy chain connection is where the plurality of hot water supply devices 2 communicate with each other in series by a daisy chain communication path DCCP. For example, the first hot water supply device 2A communicates to the system controller 30 by a first daisy chain communication path DCCP1. The second hot water supply device 2B communicates to the system controller 30 by a combination of the first daisy chain communication path DCCP1 and a second daisy chain communication path DCCP2. The third hot water supply device 2C communicates to the system controller 30 by a combination of the first daisy chain communication path DCCP1, the second daisy chain communication path DCCP2, and a third daisy chain communication path DCCP3. The fourth hot water supply device 2D communicates to the system controller 30 by a combination of the first daisy chain communication path DCCP1, the second daisy chain communication path DCCP2, the third daisy chain communication path DCCP3, and a fourth daisy chain communication path DCCP4. The fifth hot water supply device 2E communicates to the system controller 30 by a combination of the first daisy chain communication path DCCP1, the second daisy chain communication path DCCP2, the third daisy chain communication path DCCP3, the fourth daisy chain communication path DCCP4, and a fifth daisy chain communication path DCCP5. The sixth hot water supply device 2E communicates to the system controller 30 by a combination of the first daisy chain communication path DCCP1, the second daisy chain communication path DCCP2, the third daisy chain communication path DCCP3, the fourth daisy chain communication path DCCP4, the fifth daisy chain communication path DCCP5, and the sixth daisy chain communication path DCCP6. In this way, any water-supply-to-water-supply-communication-path between any of the plurality of hot water supply device 2 may be established by using a combination of the daisy chain communication path DCCP.

Referring to FIG. 8 and FIG. 9, the daisy chain communication path DCCP may be achieved by a wired connection or a wireless connection. For example, all of the plurality of hot water supply devices 2 may be daisy chained by a wire (the wire may include, for example, a cable), or all of the plurality of hot water supply devices 2 may be daisy chained without a wire (for example, wirelessly). In another example of the disclosure, the daisy chain connection may include both a wired connection and a wireless connection, wherein some hot water supply devices 2 are daisy chained by a wire, and some hot water supply devices 2 are daisy chained without a wire.

In the example embodiment illustrated in FIG. 8 and FIG. 9, the system controller 30 is shown to be disposed external to the plurality of hot water supply devices 2. However, the disclosure is not limited thereto. In another embodiment of the disclosure, the system controller 30 may be included in one of the plurality of hot water supply devices 2. The system controller 30 may be included in one of the first hot water supply device 2A, the second hot water supply device, 2B, the third hot water supply device 2C, the fourth hot water supply device 2D, the fifth hot water supply device 2E, or the sixth hot water supply device 2F. For example, the system controller 30 may be built-in to one the first hot water supply device 2A, the second hot water supply device, 2B, the third hot water supply device 2C, the fourth hot water supply device 2D, the fifth hot water supply device 2E, or the sixth hot water supply device 2F.

In a case where the system controller 30 is included in one of the hot water supply devices 2, the first hot water supply device 2 and the system controller 30 may share same components according to requirements. For example, the hot water supply device 2A and the system controller 30 may share a single processor according to requirements. In addition, for example, the hot water supply device 2A and the system controller 30 may share a single wireless communication module according to requirements. However, in another embodiment of the disclosure, the hot water supply device 2A and the system controller 30 may have separate processors and/or separate wireless communication modules.

Referring to FIG. 8 and FIG. 9, the plurality of hot water supply device 2 are configured to communicate with each other via the water-supply-to-water-supply-communication-path W-W-CP. That is to say, the water-supply-to-water-supply-communication-path W-W-CP allows the plurality of hot water supply devices 2 to communicate with each other. The water-supply-to-water-supply-communication-path W-W-CP is configured by the plurality of daisy chain communication paths DCCP. In the present embodiment, the water-supply-to-water-supply-communication-path W-W-CP is configured by the first daisy chain communication path DCCP1, the second daisy chain communication path DCCP2, the third daisy chain communication path DCCP3, the fourth daisy chain communication path DCCP4, the fifth daisy chain communication path DCCP5, and the sixth daisy chain communication path DCCP6. In this way, any hot water supply device 2 may communicate with any other hot water supply device 2 by using a combination of the daisy chain communication paths DCCP.

Figure 10:
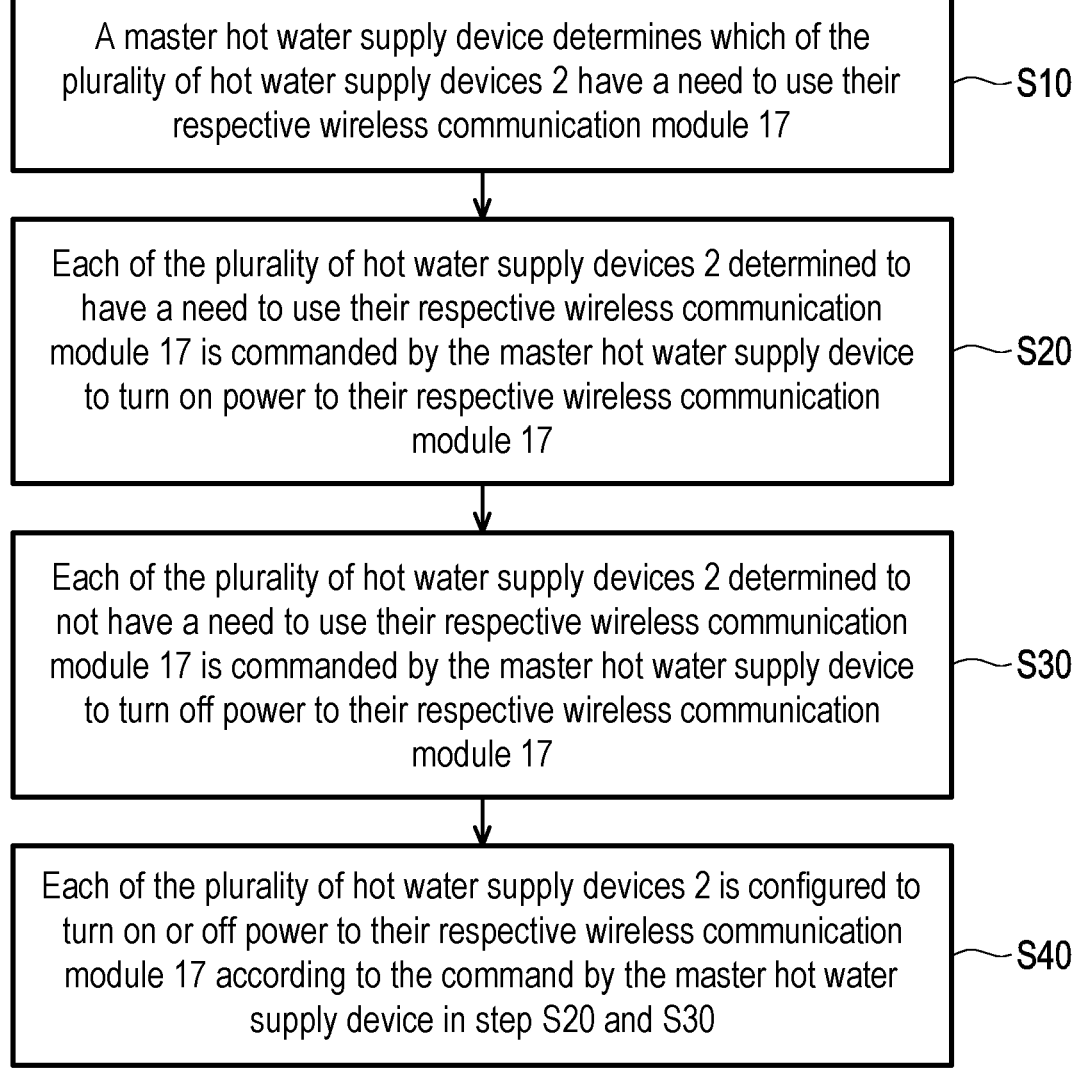
FIG. 10 is a flow chart illustrating a power saving system for a wireless communication module of the hot water supply system according to an embodiment of the disclosure.

FIG. 10 is a flow chart illustrating a power saving system for a wireless communication module of the hot water supply system according to an embodiment of the disclosure. Referring to FIG. 10, in the present embodiment, all of the plurality of hot water supply devices 2 include the wireless communication module 17. In step S10 the hot water supply system 1 is configured to determine which of the plurality of hot water supply devices 2 have a need to use their respective wireless communication module 17. More specifically, during the installation/setup of the hot water supply system 1, one hot water supply device among the plurality of hot water supply devices is set as a master hot water supply device. The master hot water supply device may be any one of the plurality of hot water supply devices 2. Generally, in the hot water supply system 1, the hot waters supply device 2 that is the first to be powered on among the plurality of hot water supply devices 2 is set as the master hot water supply device of the hot water supply system 1. The remaining hot water supply devices 2 are slave hot water supply devices that receive and follow commands from the master hot water supply device. However, the disclosure is not limited thereto, and the master hot water supply device and the slave hot water supply devices may be set according to requirements. In step S10 the master hot water supply device is configured to determine which of the plurality of hot water supply devices 2 have a need to use their respective wireless communication module 17.

Referring to FIG. 10, in step S20 each of the plurality of hot water supply devices 2 determined to have a need to use their respective wireless communication module 17 is commanded by the master hot water supply device to turn on power to their respective wireless communication module 17. In step S30, each of the plurality of hot water supply devices 2 determined to not have a need to use their respective wireless communication module 17 is commanded by the master hot water supply device to turn off power to their respective wireless communication module 17. In more detail, whether there is a need to perform wireless communication using their respective wireless communication module or not is determined at the discretion of the master hot water supply device.

Referring to FIG. 10, in step S40 each of the plurality of hot water supply devices is configured to turn on or off power to their respective wireless communication module 17 according to the command by the master hot water supply device in step S20 and S30.

Figure 11A:
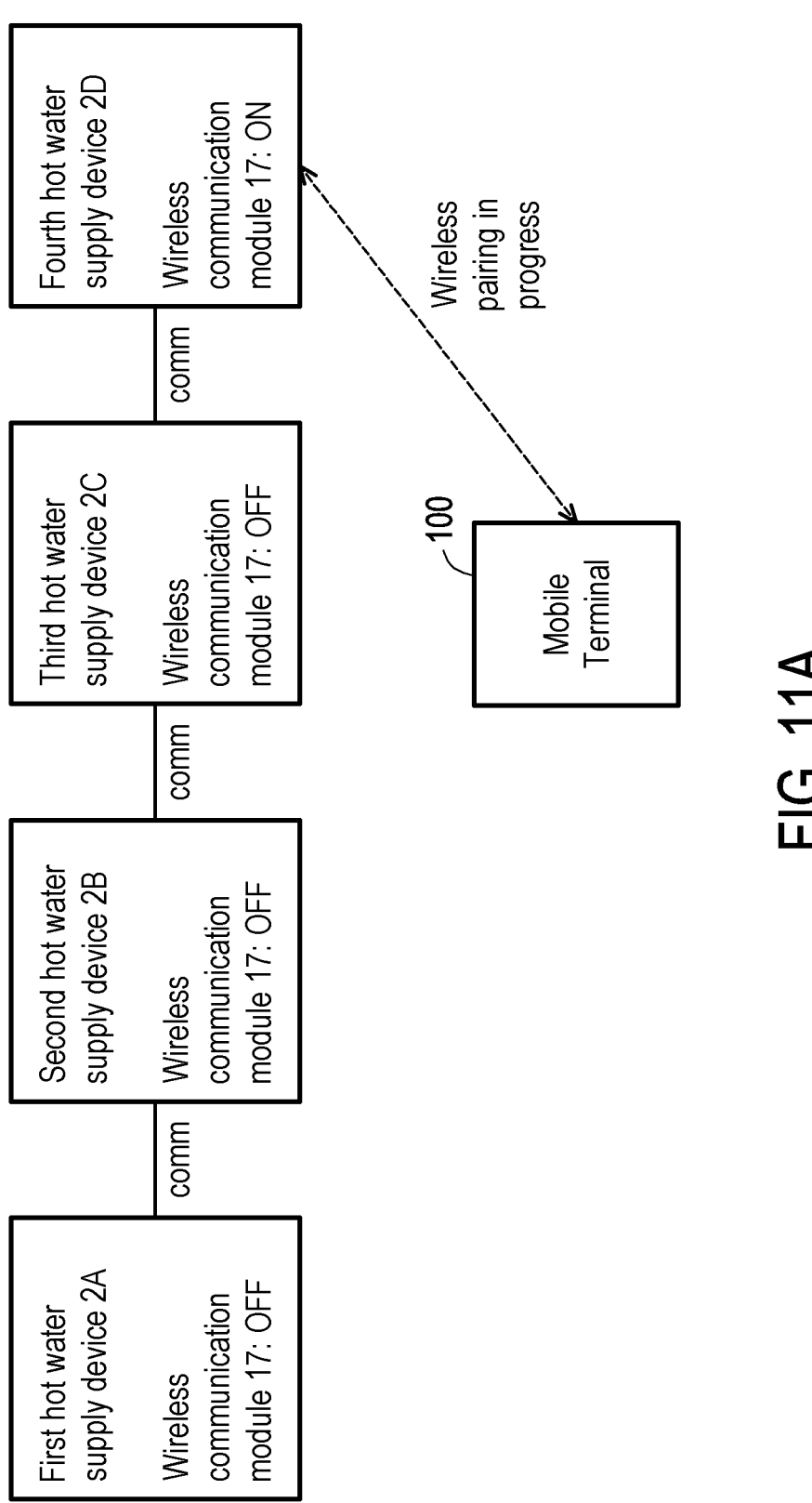
FIG. 11A and FIG. 11B each illustrate a schematic diagram when one hot water supply device is performing pairing with the mobile terminal, then other hot water supply devices not performing pairing with the mobile terminal are configured to turn off power to their wireless communication module according to an embodiment of the disclosure.
Figure 11B:
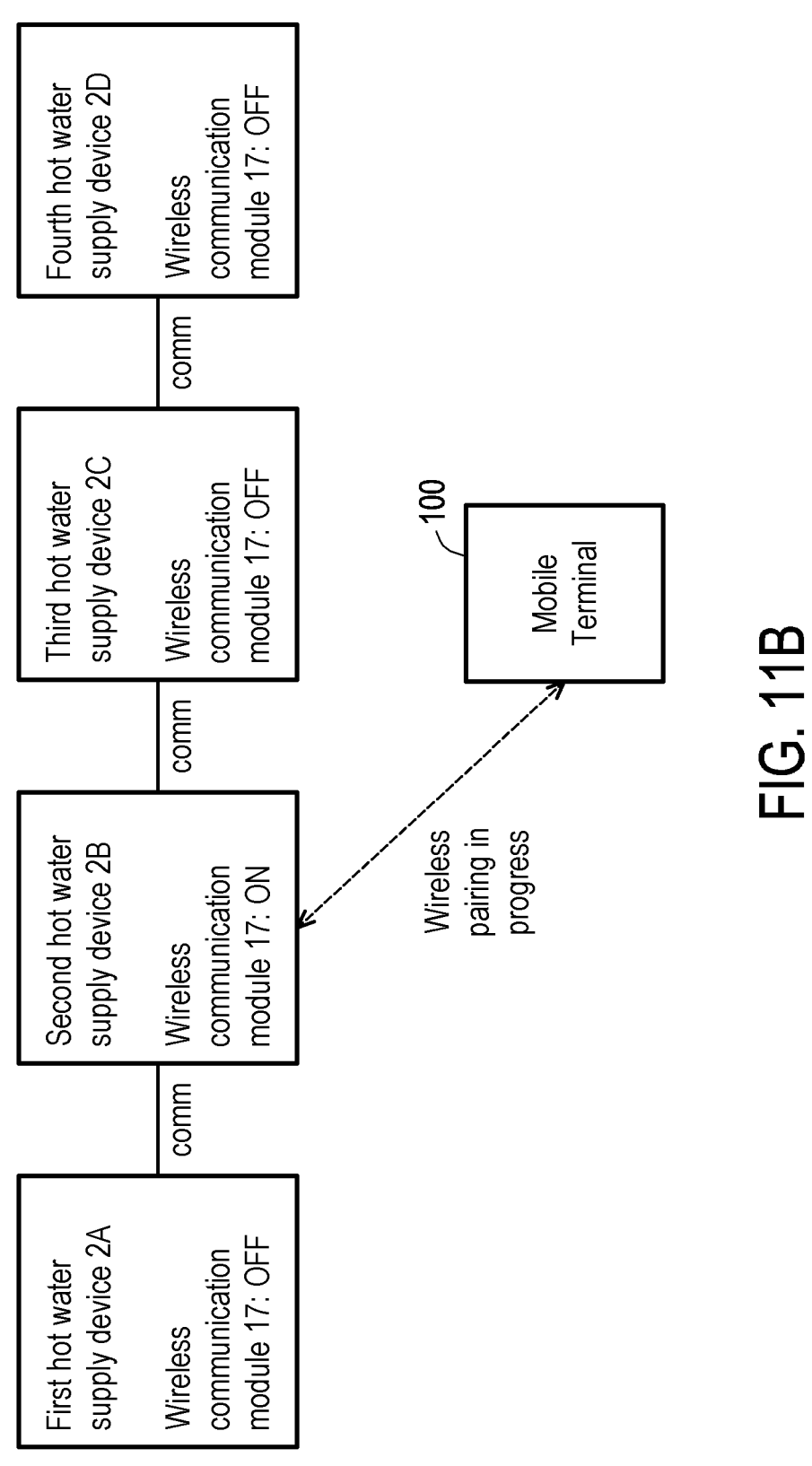

FIG. 11A and FIG. 11B each illustrate a schematic diagram when one hot water supply device is performing pairing with the mobile terminal, then other hot water supply devices not performing pairing with the mobile terminal are configured to turn off power to their wireless communication module according to an embodiment of the disclosure. Referring to FIGS. 11A and 11B, when one of the plurality of hot water supply devices 2 is performing pairing with the mobile terminal 100, other plurality of hot water supply devices among the plurality of hot water supply devices 2 not performing pairing with the mobile terminal 100 are configured to turn off power to their wireless communication modules. In this way, power may be saved for the wireless communication modules 17 that are not currently pairing with the mobile terminal 100.

Referring to FIG. 11A, after the wireless pairing of mobile terminal 100 and the fourth hot water supply device 2D is successfully completed, then the master hot water supply device may automatically command some or all of the remaining hot water supply devices 2A, 2B, 2C to turn on power to their respective wireless communication modules 17. Then, the hot water supply system 1 may proceed to perform the wireless pairing with all of the remaining hot water supply devices 2A, 2B, 2C using the one-time password process as explained in FIG. 7. In this way, power may be saved and a different factory-set password does not need to be manually inputted individually by the user for each hot water supply device 2 that is to be paired with the mobile terminal 100.

Referring to FIG. 11B, after the wireless pairing of mobile terminal 100 and the second hot water supply device 2B is successfully completed, then the master hot water supply device may automatically command some or all of the remaining hot water supply devices 2A, 2C, 2D to turn on power to their respective wireless communication modules 17. Then, the hot water supply system 1 may proceed to perform the wireless pairing with all of the remaining hot water supply devices 2A, 2C, 2D using the one-time password process as explained in FIG. 7. In this way, power may be saved and a different factory-set password does not need to be manually inputted individually by the user for each hot water supply device 2 that is to be paired with the mobile terminal 100.

Figure 12:
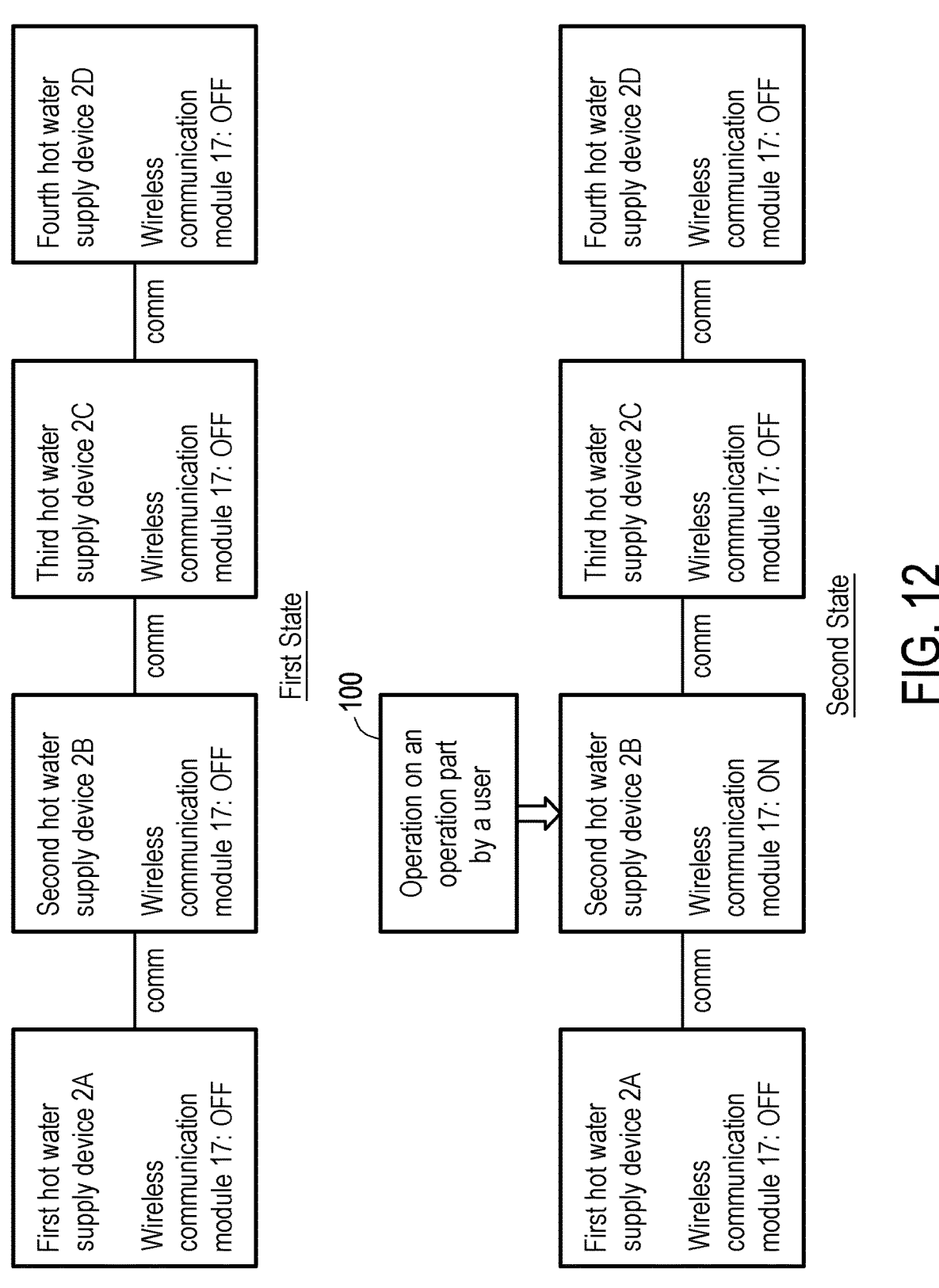
FIG. 12 is a schematic diagram illustrating an embodiment in which the hot water supply system saves power by turning off all of the wireless communication modules according to an embodiment of the disclosure.

FIG. 12 is a schematic diagram illustrating an embodiment in which the hot water supply system saves power by turning off all of the wireless communication modules according to an embodiment of the disclosure. Referring to FIG. 12, the master hot water supply device may command all of the plurality of hot water supply devices 2 to turn off power to their respective wireless communication modules 17. In more detail, the master hot water supply device may command all of the plurality of hot water supply devices 2 to turn off power to their respective wireless communication modules 17 when, for example, none of the plurality of hot water supply devices 2 are wirelessly paired with the mobile terminal 100 for greater than a predetermined time period. Then, when any hot water supply device among the plurality of hot water supply devices 2 detects an operation by a user on an operation part thereof, the any hot water supply device that detected the operation on the operation part thereof is configured to turn on power to their wireless communication module 17 for a predetermined time period. The predetermined time period may be, for example, 1 minute, 10 minutes, 20 minutes and the like. However, the disclosure is not limited thereto, and the predetermined time period may be set according to requirements. The operation part may be, for example, a button on the operation panel 15, the remote control 40, a touch screen display and/or the like. In this way, power may be saved for the wireless communication modules 17 since all of the wireless communication modules 17 are powered off, while the maintenance personnel are still able to wirelessly connect to the hot water supply devices 2 since the hot water supply device 2 that is touched/operated by the maintenance personnel are configured to turn on their respective wireless communication module 17 so that wireless pairing may be performed with the mobile terminal 100.

Referring to FIG. 12, after the wireless pairing of mobile terminal 100 and the second hot water supply device 2B is successfully completed, then the master hot water supply device may automatically command some or all of the remaining hot water supply devices 2A, 2C, 2D to turn on power to their respective wireless communication modules 17. Then, the hot water supply system 1 may proceed to perform the wireless pairing with all of the remaining hot water supply devices 2A, 2C, 2D using the one-time password process as explained in FIG. 7. In this way, power may be saved and a different factory-set password does not need to be manually inputted individually by the user for each hot water supply device 2 that is to be paired with the mobile terminal 100.

Figure 13:
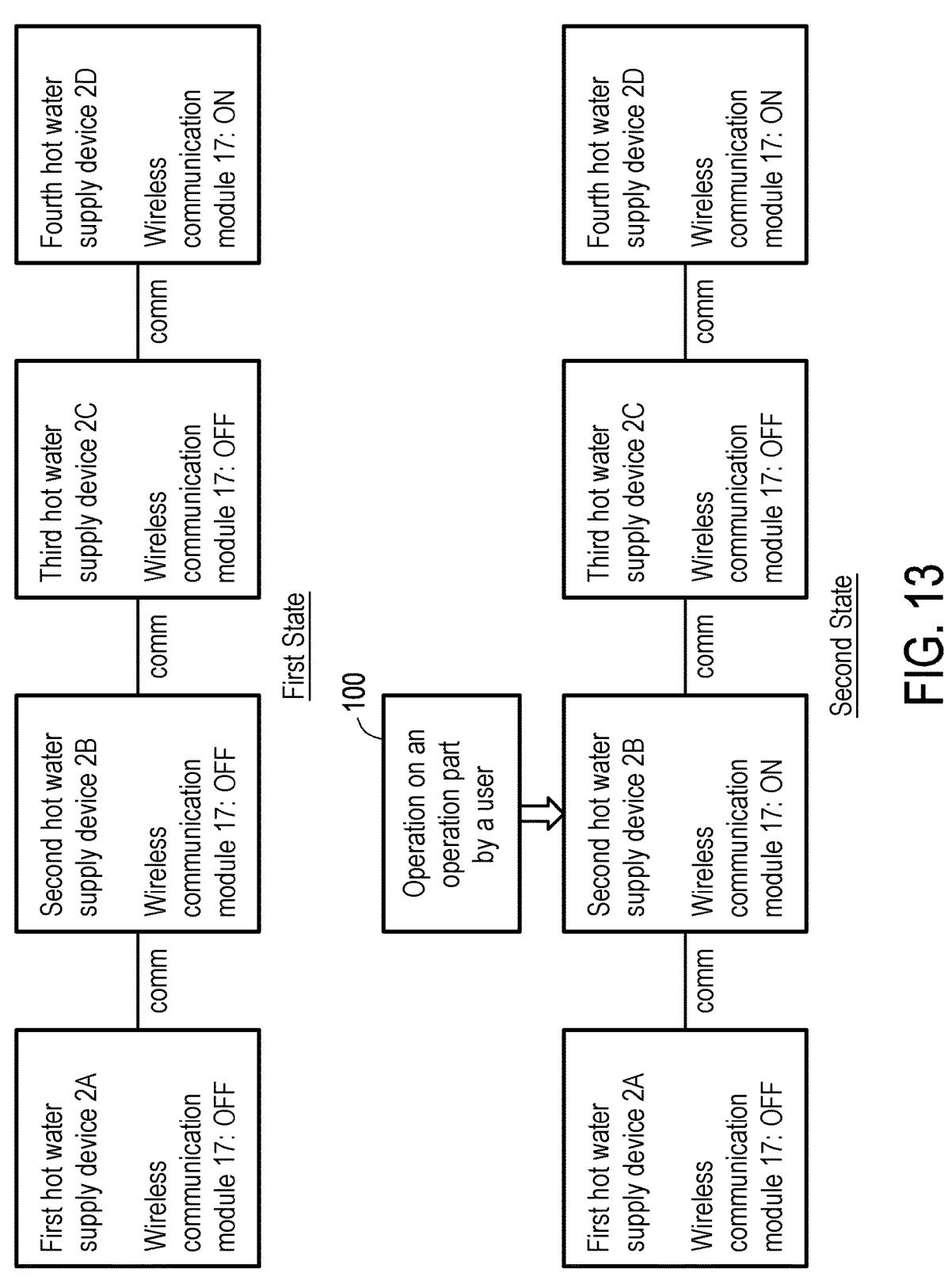
FIG. 13 is a schematic diagram illustrating an embodiment in which the hot water supply system saves power by turning on the wireless communication module of hot water supply devices that have detected an input by a user according to an embodiment of the disclosure.

FIG. 13 is a schematic diagram illustrating an embodiment in which the hot water supply system saves power by turning on the wireless communication module of hot water supply devices that have detected an input according to an embodiment of the disclosure. Referring to FIG. 13, when any hot water supply device among the plurality of hot water supply devices 2 detects an operation by a user on an operation part thereof, the any hot water supply device 2 that detected the operation on the operation part thereof may be configured to turn on power to their wireless communication module 17 for a predetermined time period, regardless of the wireless communication status of other hot water supply devices 2 (for example, even when the wireless communication module 17 of other hot water supply devices are turned on).

Referring to FIG. 13, after the wireless pairing of mobile terminal 100 and the second hot water supply device 2B is successfully completed, then the master hot water supply device may automatically command some or all of the remaining hot water supply devices 2A, 2C to turn on power to their respective wireless communication modules 17. Then, the hot water supply system 1 may proceed to perform the wireless pairing with all of the remaining hot water supply devices 2A, 2C, 2D using the one-time password process as explained in FIG. 7. In this way, power may be saved and a different factory-set password does not need to be manually inputted individually by the user for each hot water supply device 2 that is to be paired with the mobile terminal 100.

Figure 14:
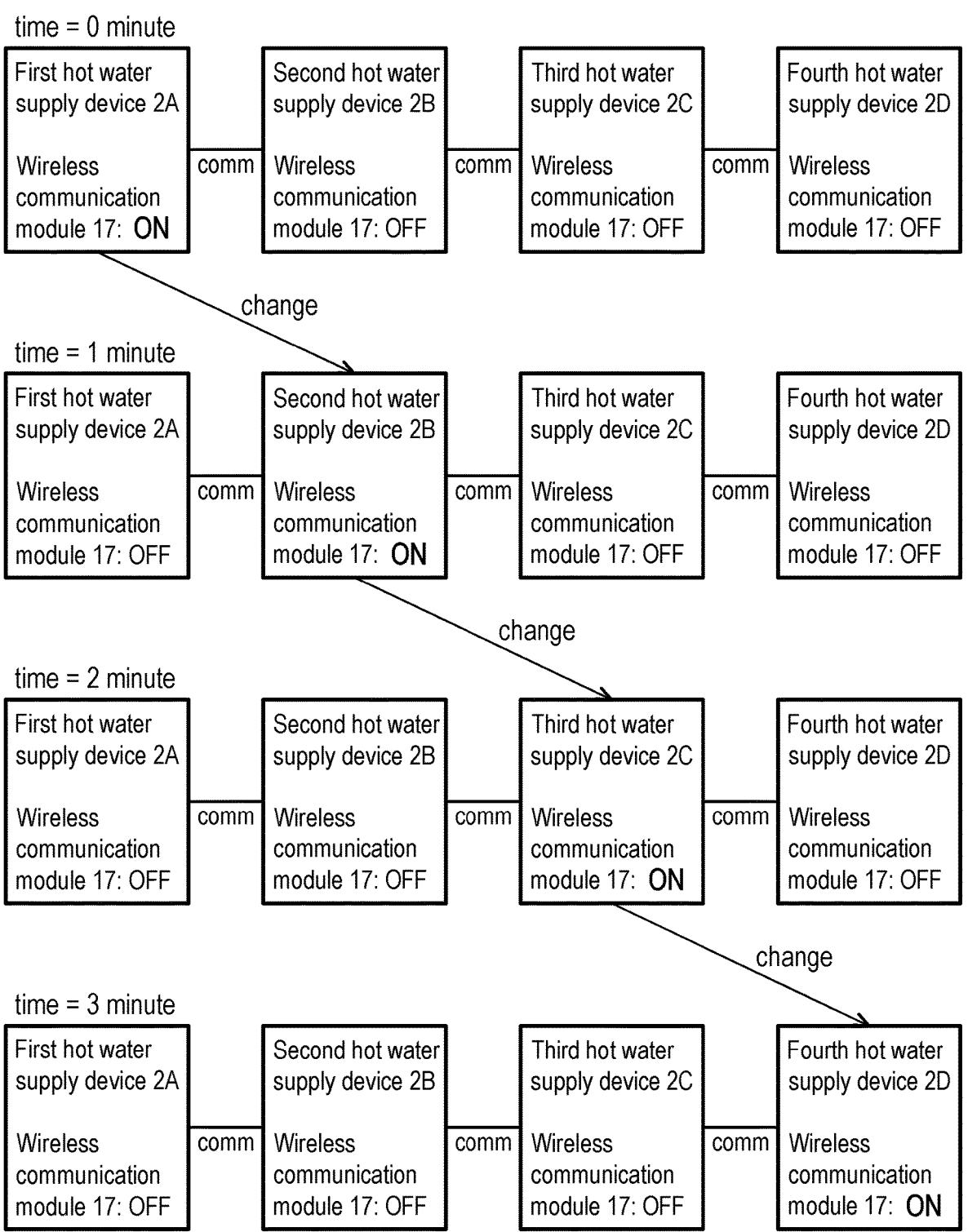
FIG. 14 is a schematic diagram illustrating an embodiment in which the hot water supply system keeps the power on to at least one of the wireless communication modules such that at least one hot water supply device may be paired with the mobile terminal at any time according to an embodiment of the disclosure.

FIG. 14 is a schematic diagram illustrating an embodiment in which the hot water supply system keeps the power on to at least one of the wireless communication modules such that at least one hot water supply device may be paired with the mobile terminal at any time according to an embodiment of the disclosure. Referring to FIG. 14, even in a case that none of the plurality of hot water supply devices 2 are communicating and/or paired with the mobile terminal 100, the hot water supply system 1 may be configured to keep power on to at least one of the wireless communication modules 17 such that there is at least one hot water supply device 2 that may be paired with the mobile terminal 100 at any time in case maintenance personnel appear on site at any time. In other words, in a case that none of the plurality of hot water supply devices 2 are currently communicating and/or paired with the mobile terminal 100, the master hot water supply device is configured to command a hot water supply device among the plurality of hot water supply devices 2 to turn on power to their respective wireless communication module 17. In more detail, in an embodiment of the disclosure, the master hot water supply device may command the wireless communication module 17 of the master hot water supply device to be turned on. In another embodiment of the disclosure, the master hot water supply device may command the wireless communication module 17 of one of the slave hot water supply devices 2 to be turned on. In this way, power may be saved by the hot water supply system 1 since not all the wireless communication modules are turned on, while the maintenance personnel are still able to wirelessly connect to at least one of the hot water supply devices 2 any time the maintenance personnel come on site for maintenance.

Referring to FIG. 14, the master hot water supply device may be configured to periodically change the respective hot water supply device that turns on power to their respective wireless communication module 17. For example, after a predetermined period of time has passed, the master hot water supply device is configured to commanded another hot water supply device among the plurality of hot water supply devices 2 to turn on power to their wireless communication module 17, and the master hot water supply device is configured to command the hot water supply device 2 to turn off power to their wireless communication module. In the present embodiment, the master hot water supply device is configured to change the respective hot water supply device 2 that turns on power to their respective wireless communication module at a timer interval of 1 minute. However, the disclosure is not limited thereto, and the time interval may be set according to requirements. The time interval may be, for example, 10 seconds, 30 seconds, 1 minute, 10 minutes and the like. In this way, since the coverage area of the wireless signal for each wireless communication module 17 is different, therefore a coverage area of the wireless signal for the hot water supply system 1 may be varied and/or increased by changing the hot water supply device 2 that turns on the wireless communication module 17. In this way, even in a situation where the mobile terminal 100 is out of range of the wireless coverage area of one of the hot water supply devices 2 at a first time instance, the mobile terminal 100 may be in range of the wireless coverage area of another one of the hot water supply devices 2 at a second time instance.

Figure 15:
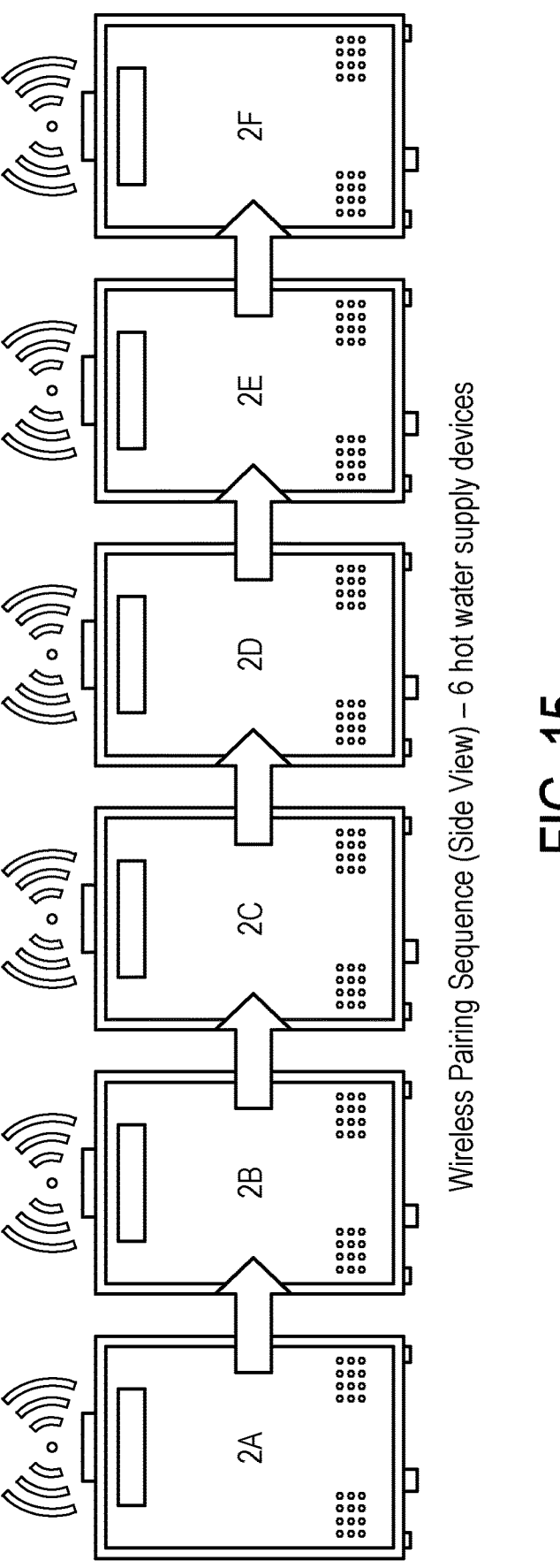
FIG. 15 is a schematic diagram illustrating a wireless pairing system in which all of the plurality of hot water supply devices are daisy chained wirelessly according to an embodiment of the disclosure.

FIG. 15 is a schematic diagram illustrating a wireless pairing system in which all of the plurality of hot water supply devices are daisy chained wirelessly according to an embodiment of the disclosure. The daisy chain and the daisy chain communication path DCCP was discussed previously in FIG. 8 and FIG. 9. Referring to FIG. 15, in the present embodiment, all of the plurality of hot water supply devices 2 are configured to communicate with each other wirelessly by the wireless connection. In order for the plurality of hot water supply devices 2 to be daisy chained with each other wirelessly to communicate with each other, the plurality of hot water supply devices 2 must first be wirelessly paired together with each other. Therefore, a hot water supply device to hot water supply device pairing process must be performed, wherein one hot water supply device among the plurality of hot water supply devices is configured to be paired with another hot water supply device among the plurality of hot water supply devices. In this way, when the plurality of hot water supply devices 2 communicate with each other by a wireless connection, a wire/cable is no longer needed to be provided between the plurality of hot water supply devices 2.

Referring to FIG. 15, the first hot water supply device 2A is paired with the second hot water supply device 2B; the second hot water supply device 2B is paired with the third hot water supply device 2C; the fourth hot water supply device 2D is paired with the fifth hot water supply device 2E; the fifth hot water supply device 2E is paired with the sixth hot water supply device 2F. The arrows shown in FIG. 15 illustrates a direction of the wireless pairing sequence in a case the wireless pairing sequence is started from the first hot water supply device 2A. The direction of the wireless pairing sequence is not limited thereto, and may be set according to requirements.

Referring to FIG. 15, in the hot water supply system 1, there are two hot water supply devices 2 which are each wirelessly paired with one other hot water supply device 2, and the remaining hot water supply devices are each wirelessly paired with two other hot water supply devices. More specifically, the first hot water supply device 2A is wirelessly paired with one other hot water supply device 2, namely the second hot water supply device 2B, and the sixth hot water supply device 2F is wirelessly paired with one other hot water supply device 2, namely the fifth hot water supply device 2E.

In addition, the second hot water supply device 2B is paired with two other hot water supply device 2, namely the first and third hot water supply devices 2A, 2C. The third hot water supply device 2C is paired with two other hot water supply device 2, namely the second and fourth hot water supply devices 2B, 2D. The fourth hot water supply device 2D is paired with two other hot water supply device 2, namely the third and fifth hot water supply devices 2C, 2E. The fifth hot water supply device 2E is paired with two other hot water supply device 2, namely the fourth and sixth hot water supply devices 2D, 2F.

Referring to FIG. 15, a user may initiate the pairing process starting from, for example, the first hot water supply device 2A. A list of the plurality of hot water supply devices 2 which are available for wireless pairing with the first hot water supply device 2A are displayed on the operation panel 15 of the first hot water supply device 2A. In an embodiment of the disclosure, the first hot water supply device 2A may be configured not to pair with any hot water supply device 2 which has an RSSI value below or equal to a predetermined value, therefore any hot water supply device 2 which has an RSSI value below or equal to a predetermined value can be omitted from being displayed on the operation panel 15 of the first hot water supply device 2A. The predetermined value may be, for example, 65 dBm, 80 dbm, and/or the like. However, the disclosure is not limited thereto, and the predetermined value may be set according to requirements. In another embodiment of the disclosure, the first hot water supply device 2A may be configured to display only the hot water supply device 2 that has a highest received signal strength indicator (RSSI) value among the plurality of hot water supply devices 2.

The user/installation personnel selects one of the plurality of hot water supply devices 2 from the list displayed on the operation panel 15 that has a highest received signal strength indicator (RSSI) value among the plurality of hot water supply devices 2. Alternatively, the first hot water supply device 2A may automatically select to pair with the second hot water supply device 2B having the highest received signal strength indicator (RSSI) value among the plurality of hot water supply devices 2. The second hot water supply device 2B should have the highest received signal strength indicator (RSSI) value among the plurality of hot water supply devices 2, since the second hot water supply device 2B is located closest to the first hot water supply device 2A. Then, the user enters the factory-set password of the second hot water supply device 2B to establish a wireless daisy chain connection between the first hot water supply device 2A and the second hot water supply device 2B.

Referring to FIG. 15, after the first hot water supply device 2A is paired with the second hot water supply device 2B, next the user moves to the hot water supply device 2 which has just been paired with the first hot water supply device 2A to perform the pairing process. The hot water supply device 2 which has just been paired with the first hot water supply device 2A is the second hot water supply device 2B. Therefore, the user moves to the second hot water supply device 2B to perform the pairing process. A list of the plurality of hot water supply devices 2 which are available for wireless pairing with the second hot water supply device 2B are displayed on the operation panel 15 of the second hot water supply device 2B. The user/installation personnel selects one of the plurality of hot water supply devices 2 from the list displayed on the operation panel 15 that has a highest received signal strength indicator (RSSI) value among the plurality of hot water supply devices 2. Alternatively, the second hot water supply device 2B may automatically select to pair with the third hot water supply device 2C having the highest received signal strength indicator (RSSI) value among the plurality of hot water supply devices 2. The third hot water supply device 2C should have the highest received signal strength indicator (RSSI) value among the plurality of hot water supply devices 2, since the third hot water supply device 2C is located closest to the second hot water supply device 2B. It should be noted, the first hot water supply device 2A may have a similar signal strength indicator (RSSI) value as the third hot water supply device 2C since the first hot water supply device 2A and the third hot water supply device 2C are both adjacent to the second hot water supply device 2B, however the second hot water supply device 2B is configured to pair with another hot water supply device 2 which is currently not paired with any of the plurality of hot water supply devices 2 and having the highest received signal strength indicator (RSSI) value. Therefore, the second hot water supply device 2B pairs with the third hot water supply device 2C. Then, the user enters the factory-set password of the third hot water supply device 2C to establish a wireless daisy chain connection between the second hot water supply device 2B and the third hot water supply device 2C.

Referring to FIG. 15, after the second hot water supply device 2B is paired with the third hot water supply device 2C, next the user moves to the hot water supply device 2 which has just been paired with the second hot water supply device 2B to perform the pairing process. The hot water supply device 2 which has just been paired with the second hot water supply device 2B is the third hot water supply device 2C. Therefore, the user moves to the third hot water supply device 2C to perform the pairing process. A list of the plurality of hot water supply devices 2 which are available for wireless pairing with the third hot water supply device 2C are displayed on the operation panel 15 of the third hot water supply device 2C. The user/installation personnel selects one of the plurality of hot water supply devices 2 from the list displayed on the operation panel 15 that has a highest received signal strength indicator (RSSI) value among the plurality of hot water supply devices 2. Alternatively, the third hot water supply device 2C may automatically select to pair with the fourth hot water supply device 2D having the highest received signal strength indicator (RSSI) value among the plurality of hot water supply devices 2. The fourth hot water supply device 2D should have the highest received signal strength indicator (RSSI) value among the plurality of hot water supply devices 2, since the fourth hot water supply device 2D is located closest to the third hot water supply device 2C. It should be noted, the second hot water supply device 2B may have a similar signal strength indicator (RSSI) value as the fourth hot water supply device 2D since the second hot water supply device 2B and the fourth hot water supply device 2D are both adjacent to the third hot water supply device 2C, however the third hot water supply device 2C is configured to pair with another hot water supply device 2 which is currently not paired with any of the plurality of hot water supply devices 2 and having the highest received signal strength indicator (RSSI) value. Therefore, the third hot water supply device 2C pairs with the fourth hot water supply device 2D. Then, the user enters the factory-set password of the fourth hot water supply device 2D to establish a wireless daisy chain connection between the third hot water supply device 2C and the fourth hot water supply device 2D.

Referring to FIG. 15, after the third hot water supply device 2C is paired with the fourth hot water supply device 2D, next the user moves to the hot water supply device 2 which has just been paired with the third hot water supply device 2C to perform the pairing process. The hot water supply device 2 which has just been paired with the third hot water supply device 2C is the fourth hot water supply device 2D. Therefore, the user moves to the fourth hot water supply device 2D to perform the pairing process. A list of the plurality of hot water supply devices 2 which are available for wireless pairing with the fourth hot water supply device 2D are displayed on the operation panel 15 of the fourth hot water supply device 2D. The user/installation personnel selects one of the plurality of hot water supply devices 2 from the list displayed on the operation panel 15 that has a highest received signal strength indicator (RSSI) value among the plurality of hot water supply devices 2. Alternatively, the fourth hot water supply device 2D may automatically select to pair with the fifth hot water supply device 2E having the highest received signal strength indicator (RSSI) value among the plurality of hot water supply devices 2. The fifth hot water supply device 2E should have the highest received signal strength indicator (RSSI) value among the plurality of hot water supply devices 2, since the fifth hot water supply device 2E is located closest to the fourth hot water supply device 2D. It should be noted, the third hot water supply device 2C may have a similar signal strength indicator (RSSI) value as the fifth hot water supply device 2E since the third hot water supply device 2C and the fifth hot water supply device 2E are both adjacent to the fourth hot water supply device 2D, however the fourth hot water supply device 2D is configured to pair with another hot water supply device 2 which is currently not paired with any of the plurality of hot water supply devices 2 and having the highest received signal strength indicator (RSSI) value. Therefore, the fourth hot water supply device 2D pairs with the fifth hot water supply device 2E. Then, the user enters the factory-set password of the fifth hot water supply device 2E to establish a wireless daisy chain connection between the fourth hot water supply device 2D and the fifth hot water supply device 2E.

Referring to FIG. 15, after the fourth hot water supply device 2D is paired with the fifth hot water supply device 2E, next the user moves to the hot water supply device 2 which has just been paired with the fourth hot water supply device 2D to perform the pairing process. The hot water supply device 2 which has just been paired with the fourth hot water supply device 2D is the fifth hot water supply device 2E. Therefore, the user moves to the fifth hot water supply device 2E to perform the pairing process. A list of the plurality of hot water supply devices 2 which are available for wireless pairing with the fifth hot water supply device 2E are displayed on the operation panel 15 of the fifth hot water supply device 2E. The user/installation personnel selects one of the plurality of hot water supply devices 2 from the list displayed on the operation panel 15 that has a highest received signal strength indicator (RSSI) value among the plurality of hot water supply devices 2. Alternatively, the fifth hot water supply device 2E may automatically select to pair with the sixth hot water supply device 2F having the highest received signal strength indicator (RSSI) value among the plurality of hot water supply devices 2. The sixth hot water supply device 2F should have the highest received signal strength indicator (RSSI) value among the plurality of hot water supply devices 2, since the sixth hot water supply device 2F is located closest to the fifth hot water supply device 2E. It should be noted, the fourth hot water supply device 2D may have a similar signal strength indicator (RSSI) value as the sixth hot water supply device 2F since the fourth hot water supply device 2D and the sixth hot water supply device 2F are both adjacent to the fifth hot water supply device 2E, however the fifth hot water supply device 2E is configured to pair with another hot water supply device 2 which is currently not paired with any of the plurality of hot water supply devices 2 and having the highest received signal strength indicator (RSSI) value. Therefore, the fifth hot water supply device 2E pairs with the sixth hot water supply device 2F. Then, the user enters the factory-set password of the sixth hot water supply device 2F to establish a wireless daisy chain connection between the fifth hot water supply device 2E and the sixth hot water supply device 2F.

Referring to FIG. 15, the wireless pairing process in order for the plurality of hot water supply devices 2 to be daisy chained with each other wirelessly was explained above. The arrows shown in FIG. 15 illustrated a direction of the wireless pairing sequence in a case the wireless pairing sequence is started from the first hot water supply device 2A and ends at the sixth hot water supply device 2F. The direction of the wireless pairing sequence is not limited thereto, and may be set according to requirements.

Figure 16:
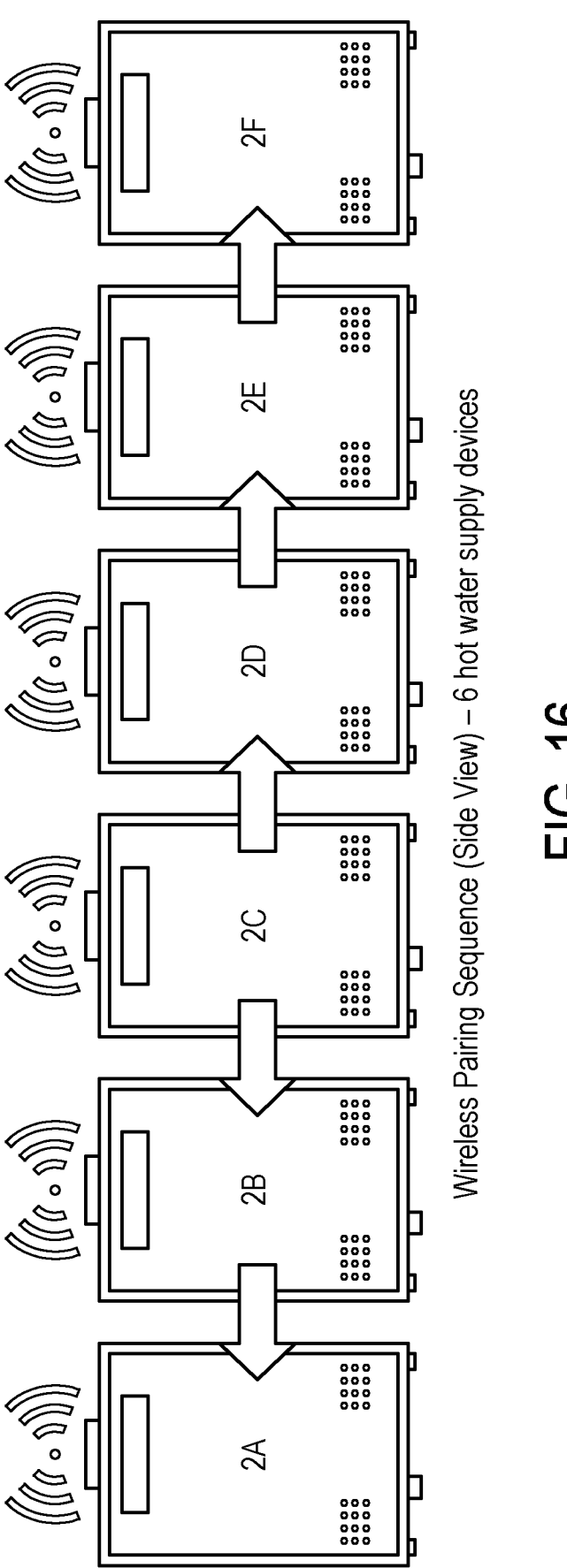
FIG. 16 is a schematic diagram illustrating a wireless pairing system in which all of the plurality of hot water supply devices are daisy chained wirelessly according to an embodiment of the disclosure.

FIG. 16 is a schematic diagram illustrating a wireless pairing system in which all of the plurality of hot water supply devices are daisy chained wirelessly according to an embodiment of the disclosure. Referring to FIG. 16, a user may initiate the pairing process starting from, for example, the third hot water supply device 2C. A list of the plurality of hot water supply devices 2 which are available for wireless pairing with the third hot water supply device 2C are displayed on the operation panel 15 of the third hot water supply device 2C. The user/installation personnel selects one of the plurality of hot water supply devices 2 from the list displayed on the operation panel 15 that has a highest received signal strength indicator (RSSI) value among the plurality of hot water supply devices 2. The second hot water supply device 2B and the fourth hot water supply device 2D should have the highest received signal strength indicator (RSSI) value among the plurality of hot water supply devices 2, since the second hot water supply device 2B and the fourth hot water supply device 2D are located closest to the third hot water supply device 2C. One of the second hot water supply device 2B or the fourth hot water supply device 2D is selected for pairing by the third hot water supply device 2C, since both the second hot water supply device 2B and the fourth hot water supply device 2D are currently not paired with any of the plurality of hot water supply devices 2 and both have the highest received signal strength indicator (RSSI) value. In the present embodiment, assuming the RSSI value of the fourth hot water supply device 2D is greater the RSSI value of the second hot water supply device 2B, the user selects the fourth hot water supply device 2D for wireless pairing, and then proceeds with the wireless pairing towards the right side until the daisy chain is completed to the sixth hot water supply device 2F. Then, the user circles back to the third hot water supply device 2C to perform wireless pairing. The user selects the second hot water supply device 2B for wireless pairing, and then proceeds with the wireless pairing towards the left side until the daisy chain is completed to the first hot water supply device 2A. In this way, the wireless daisy chain is completed for the plurality of hot water supply devices 2. In another embodiment of the disclosure, assuming the RSSI value of the second hot water supply device 2B is greater the RSSI value of the fourth hot water supply device 2D, the user selects the second hot water supply device 2B for wireless pairing, and then proceeds with the wireless pairing towards the left side until the daisy chain is completed to the first hot water supply device 2A. Then, the user circles back to the third hot water supply device 2C to perform wireless pairing. The user selects the fourth hot water supply device 2D for wireless pairing, and then proceeds with the wireless pairing towards the right side until the daisy chain is completed to the sixth hot water supply device 2F.

Figure 17:
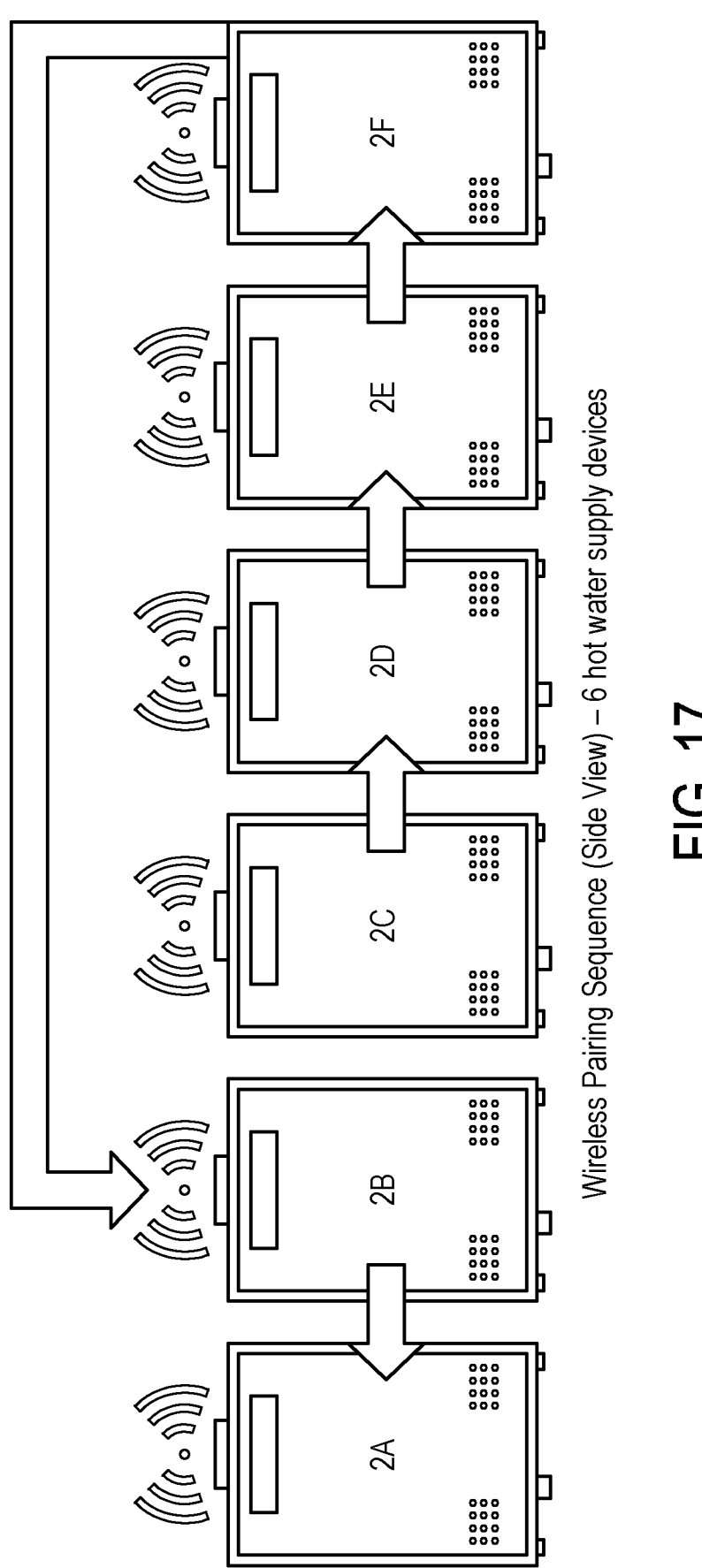
FIG. 17 is a schematic diagram illustrating a wireless pairing system in which all of the plurality of hot water supply devices are daisy chained wirelessly according to an embodiment of the disclosure.

FIG. 17 is a schematic diagram illustrating a wireless pairing system in which all of the plurality of hot water supply devices are daisy chained wirelessly according to an embodiment of the disclosure. Referring to FIG. 17, when the user moves to the hot water supply device 2 which has just been paired with the fourth hot water supply device 2D to perform the pairing process. The hot water supply device 2 which has just been paired with the fifth hot water supply device 2E is the sixth hot water supply device 2F. Therefore, the user moves to the sixth hot water supply device 2F to perform the pairing process. A list of the plurality of hot water supply devices 2 which are available for wireless pairing with the sixth hot water supply device 2F are displayed on the operation panel 15 of the sixth hot water supply device 2F. The user/installation personnel selects one of the plurality of hot water supply devices 2 from the list displayed on the operation panel 15 that has a highest received signal strength indicator (RSSI) value among the plurality of hot water supply devices 2. Alternatively, the fifth hot water supply device 2E may automatically select to pair with the second hot water supply device 2B having the highest received signal strength indicator (RSSI) value among the plurality of hot water supply devices 2. The second hot water supply device 2B should have the highest received signal strength indicator (RSSI) value among the plurality of hot water supply devices 2, since the second hot water supply device 2B is located closest to the sixth hot water supply device 2F. It should be noted, the third hot water supply device, 2C, the fourth hot water supply device 2D, and the fifth hot water supply device 2E may have a greater signal strength indicator (RSSI) value than the second hot water supply device 2B since they are located closer to the sixth hot water supply device 2F, however the sixth hot water supply device 2F is configured to pair with another hot water supply device 2 which is currently not paired with any of the plurality of hot water supply devices 2 and having the highest received signal strength indicator (RSSI) value. Therefore, the sixth hot water supply device 2F pairs with the second hot water supply device 2B. Then, the user enters the factory-set password of the second hot water supply device 2B to establish a wireless daisy chain connection between the sixth hot water supply device 2F and the second hot water supply device 2B. The user may then proceed with the wireless pairing towards the left side until the daisy chain is completed to the first hot water supply device 2A.

Figures 18, 19:
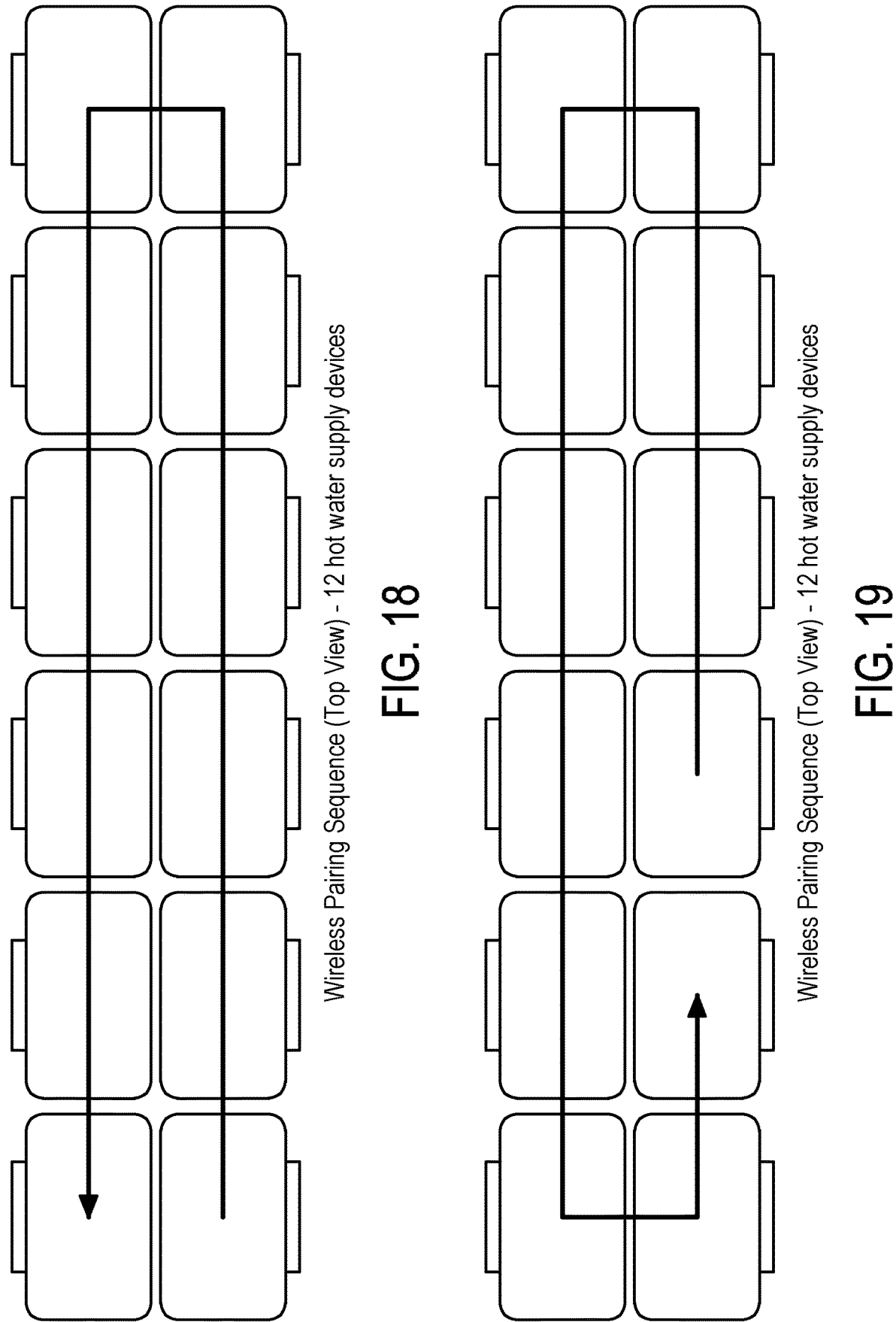
FIG. 18 is a schematic diagram illustrating a wireless pairing system in which there are multiple rows of the plurality of hot water supply devices according to an embodiment of the disclosure.
FIG. 19 is a schematic diagram illustrating a wireless pairing system in which there are multiple rows of the plurality of hot water supply devices according to an embodiment of the disclosure.
Figure 20:
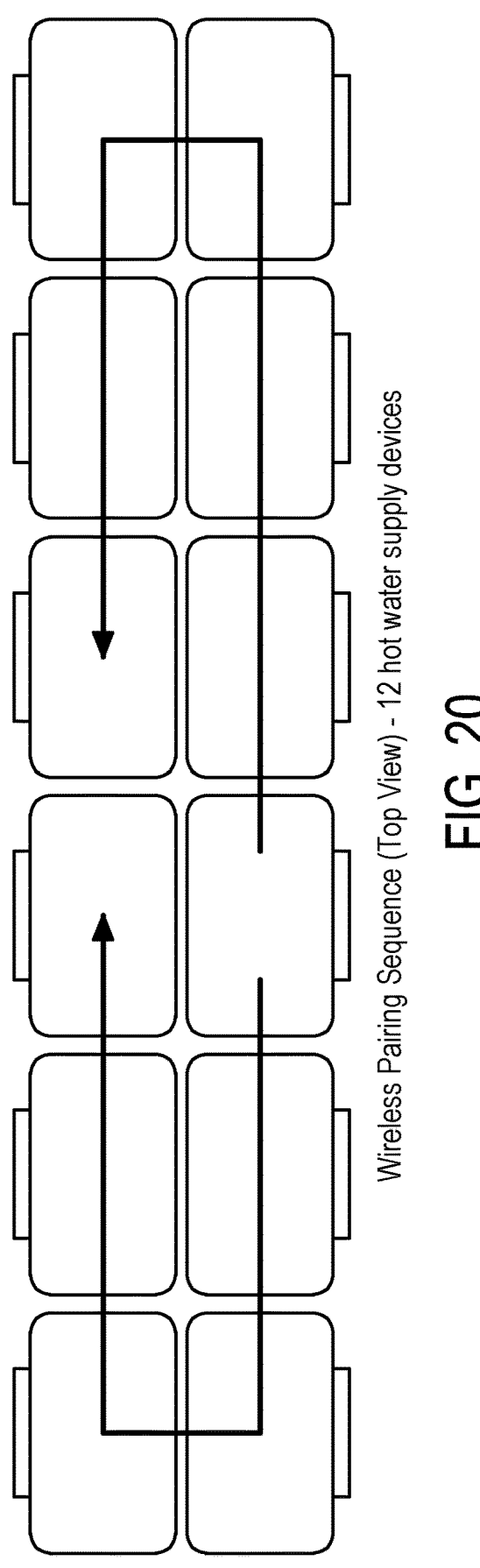
FIG. 20 is a schematic diagram illustrating a wireless pairing system in which there are multiple rows of the plurality of hot water supply devices according to an embodiment of the disclosure.

FIG. 18 is a schematic diagram illustrating a wireless pairing system in which there are multiple rows of the plurality of hot water supply devices according to an embodiment of the disclosure. FIG. 19 is a schematic diagram illustrating a wireless pairing system in which there are multiple rows of the plurality of hot water supply devices according to an embodiment of the disclosure. FIG. 20 is a schematic diagram illustrating a wireless pairing system in which there are multiple rows of the plurality of hot water supply devices according to an embodiment of the disclosure. The arrows shown in FIG. 18-20 illustrate a direction of the wireless pairing sequence. However, the direction of the wireless pairing sequence is not limited thereto, and may be set according to requirements.

Referring to FIG. 15-20, each of the plurality of hot water supply devices 2 that is currently paired with any hot water supply device 2 among the plurality of hot water supply devices 2, may be configured to display on a display part of each of the plurality of hot water supply devices 2 an indicator indicating that pairing is complete.

The display part of the hot water supply device 2 may include, for example, a display or a light, wherein the hot water supply device 2 currently successfully paired with another hot water supply 2 has the light turned ON, or the display displaying a light or message indicating the hot water supply device 2 is successfully paired with another hot water supply device 2. The light may be, for example, a light bulb or an LED. In another embodiment, the indicator may be a sound. In this way, installation/maintenance personnel may easily identify the hot water supply device 2 (or hot water supply devices 2) which is currently successfully paired with another hot water supply device 2. In this way, a situation where the wireless pairing of some hot water supply devices being inadvertently missed may be reduced/prevented. Furthermore, the display part of the hot water supply device 2 may be configured to display a total number of hot water supply devices 2 that have completed pairing.

In addition, the mobile terminal 100 communicating with at least one of the hot waters supply devices 2 of the hot water supply system 1 may be configured to display, on a display of the mobile terminal 100, a total number of hot water supply devices 2 that have completed pairing. That is to say, the hot water supply devices 2 may transmit to the mobile terminal 100 as data, the total number of hot water supply devices 2 that have completed pairing. In this way, installation/maintenance personnel may easily identify the number of hot water supply devices 2 that have completed wireless pairing. In this way, a situation where the wireless pairing of some hot water supply devices being inadvertently missed may be reduced and/or prevented.

Figure 21:
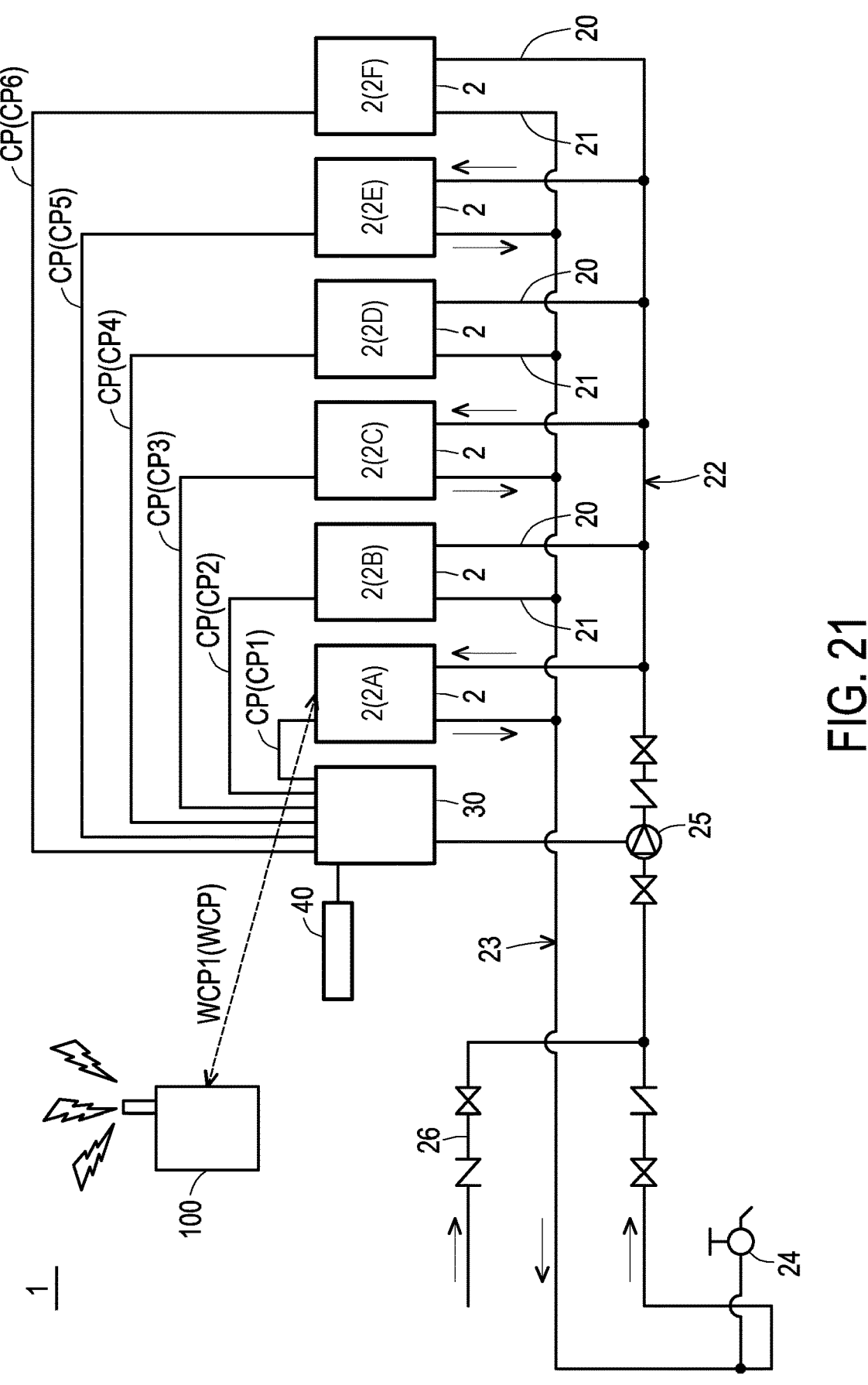
FIG. 21 is a schematic diagram illustrating a hot water supply system having a star connection configured to transmit and receive data to and from a mobile terminal via only a single hot water supply device according to an embodiment of the disclosure.

FIG. 21 is a schematic diagram illustrating a hot water supply system having a star connection configured to transmit and receive data to and from a mobile terminal via only a single hot water supply device according to an embodiment of the disclosure. Referring to FIG. 21, a single hot water supply devices 2 is configured to be paired with the mobile terminal 100 to establish a first wireless communication path WCP1 between the single hot water supply device 2 and the mobile terminal 100 for transmitting and receiving data, wherein hot water supply devices 2 other than the single hot water supply device 2 are configured to transmit and receive data to and from the mobile terminal 100 via the single hot water supply device 2. In other words, the hot water supply devices 2 other than the single hot water supply device 2 are not paired with the mobile terminal 100. In this way, pairing only needs to be performed between the mobile terminal 100 and the single hot water supply device, and a pairing time needed for pairing with the other hot water supply devices may be omitted.

In the present embodiment, only the single hot water supply device includes the wireless communication module 17, while the hot water supply devices other than the single hot water supply device do not include a wireless communication module 17. However, the disclosure is not limited thereto, and the number of hot water supply devices 2 that include the wireless communication module 17 may be set according to requirements. For example, in another embodiment of the disclosure, the single hot water supply device may include the wireless communication module 17, while one or more of the hot water supply devices 2 other than the single hot water supply device may also include the wireless communication module 17.

Referring to FIG. 21, in the present embodiment, the first hot water supply device 2A is configured as the single hot water supply device that is to be paired with the mobile terminal 100 to establish the first wireless communication path WCP1 between the first hot water supply device 2A and the mobile terminal 100 for transmitting and receiving data, wherein hot water supply devices 2B~2F other than the first hot water supply device 2A are configured to transmit and receive data to and from the mobile terminal 100 via the first hot water supply device 2A. In other words, the hot water supply devices 2B~2F other than the single hot water supply device 2A are not paired with the mobile terminal 100.

In the present embodiment, the first hot water supply device 2A is illustrated as the single hot water supply devices 2 that is paired with the mobile terminal 100 to establish the first wireless communication path WCP1 between the first hot water supply device 2A and the mobile terminal 100. However, the disclosure is not limited thereto. In other embodiments of the disclosure, any of hot water supply devices 2B~2F may be configured as the single hot water supply device that is paired with the mobile terminal 100 to establish the first wireless communication path WCP1, while the other hot water supply devices are configured to transmit and receive data to and from the mobile terminal 100 via the single hot water supply device that is paired with the mobile terminal 100.

In the embodiment of FIG. 21, each of the plurality of hot water supply devices 2 are directly wired to the system controller 30. Any communication between the mobile terminal 100 to the plurality of hot water supply devices 2 must pass through the single hot waters supply device 2, namely the first hot water supply device 2A in the present embodiment. Therefore, the user must specify, via the mobile terminal 100, which one of the plurality of hot water supply devices 2 the mobile terminal 100 has designated to communicate with, wherein the system controller 30 is configured to receive a designation instruction from the mobile terminal 100 via the first hot water supply device 2A, the designation instruction specifying which one of the plurality of hot water supply devices 2 the mobile terminal 100 has designated to communicate with. Then, the system controller 30 relays a communication (data) between the mobile terminal 100 and the one of the plurality of hot water supply devices 2 that is designated in the designation instruction.

For example, when the designation instruction designated the fourth hot water supply device 2D as the hot water supply device 2 that the mobile terminal 100 has designated to communicate with, then the system controller 30 relays the communication (data) after the designation instruction to and from the fourth hot water supply device 2D via the communication path CP. In this way, the mobile terminal 100 may communicate directly with the designated hot water supply device, such that data may be exchanged in a short time.

Figure 22:
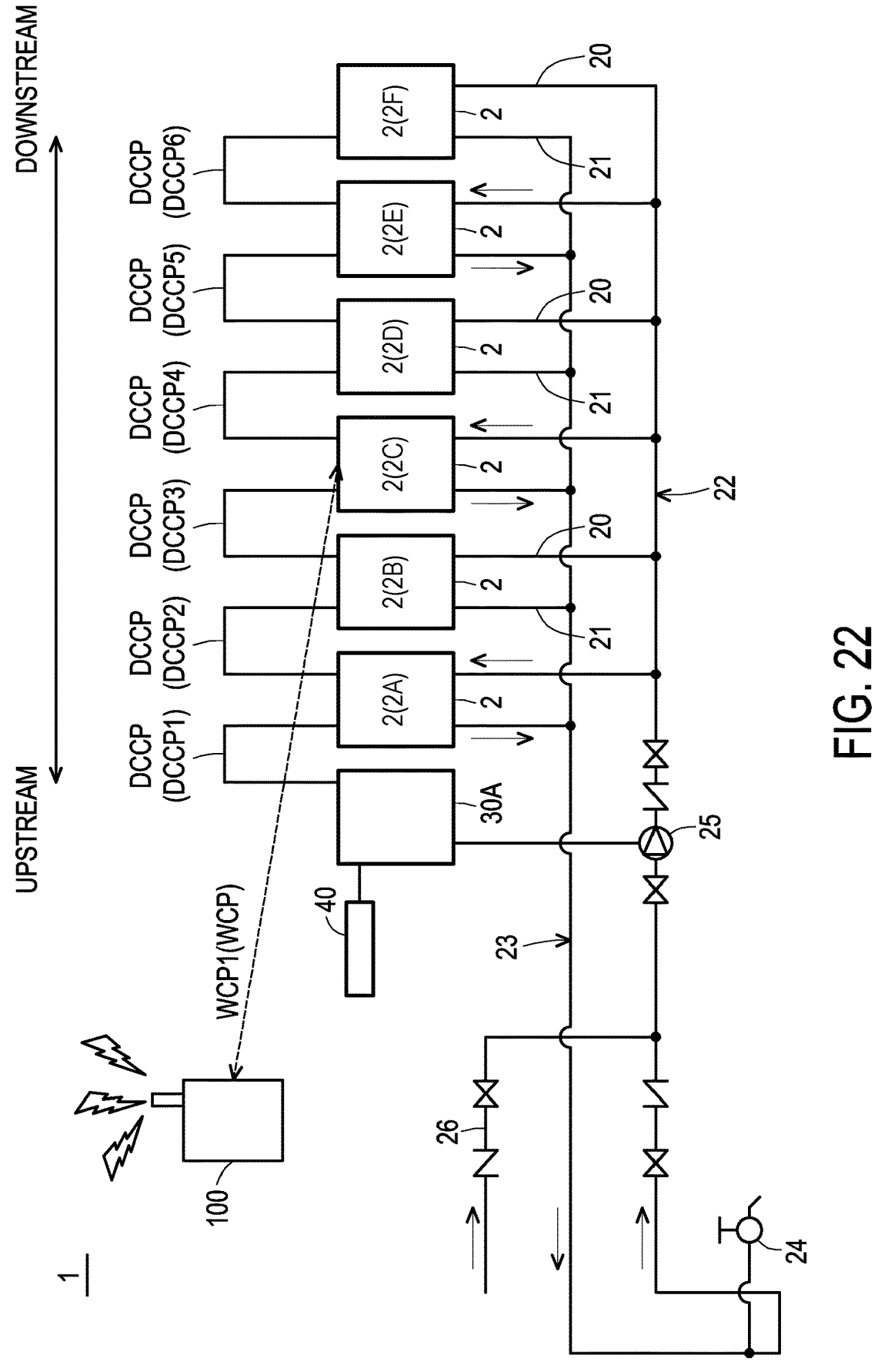
FIG. 22 is a schematic diagram illustrating a hot water supply system having a daisy chain connection configured to transmit and receive data to and from a mobile terminal via only a single hot water supply device according to an embodiment of the disclosure.

FIG. 22 is a schematic diagram illustrating a hot water supply system having a daisy chain connection configured to transmit and receive data to and from a mobile terminal via only a single hot water supply device according to an embodiment of the disclosure. Referring to FIG. 22, a single hot water supply devices 2 is configured to be paired with the mobile terminal 100 to establish a first wireless communication path WCP1 between the single hot water supply device 2 and the mobile terminal 100 for transmitting and receiving data, wherein hot water supply devices 2 other than the single hot water supply device 2 are configured to transmit and receive data to and from the mobile terminal 100 via the single hot water supply device 2. In other words, the hot water supply devices 2 other than the single hot water supply device 2 are not paired with the mobile terminal 100. In this way, pairing only needs to be performed between the mobile terminal 100 and the single hot water supply device, and a pairing time needed for pairing with the other hot water supply devices may be omitted.

In the present embodiment, only the single hot water supply device includes the wireless communication module 17, while the hot water supply devices other than the single hot water supply device do not include a wireless communication module 17. However, the disclosure is not limited thereto, and the number of hot water supply devices 2 that include wireless communication module 17 may be set according to requirements. For example, in another embodiment of the disclosure, the single hot water supply device may include the wireless communication module 17, while one or more of the hot water supply devices other than the single hot water supply device may also include the wireless communication module 17.

Referring to FIG. 22, in the present embodiment, the third hot water supply device 2C is configured as the single hot water supply device that is to be paired with the mobile terminal 100 to establish the first wireless communication path WCP1 between the third hot water supply device 2C and the mobile terminal 100 for transmitting and receiving data, wherein hot water supply devices 2A, 2B, 2D, 2E, 2F other than the third hot water supply device 2C are configured to transmit and receive data to and from the mobile terminal 100 via the third hot water supply device 2C. In other words, the hot water supply devices 2A, 2B, 2D, 2E, 2F other than the single hot water supply device 2C are not paired with the mobile terminal 100.

In the present embodiment, the third hot water supply device 2C is illustrated as the single hot water supply devices 2 that is paired with the mobile terminal 100 to establish the first wireless communication path WCP1 between the third hot water supply device 2C and the mobile terminal 100. However, the disclosure is not limited thereto. In other embodiments of the disclosure, any of hot water supply devices 2A, 2B, 2D, 2E, 2F may be configured as the single hot water supply device that is paired with the mobile terminal 100 to establish the first wireless communication path WCP1, while the other hot water supply devices are configured to transmit and receive data to and from the mobile terminal 100 via the single hot water supply device that is paired with the mobile terminal 100.

In the embodiment of FIG. 22, each of the plurality of hot water supply devices 2 are wired with each other in series. Any communication between the mobile terminal 100 to the plurality of hot water supply devices 2 must pass through the single hot waters supply device, namely the third hot water supply device 2C in the present embodiment. Therefore, the user must specify, via the mobile terminal 100, which one of the plurality of hot water supply devices 2 the mobile terminal 100 has designated to communicate with, wherein the third hot water supply device 2C is configured to receive a designation instruction from the mobile terminal 100, the designation instruction specifying which one of the plurality of hot water supply devices 2 the mobile terminal has designated to communicate with. Then, when the one of the plurality of hot water supply devices 2 that is designated in the designation instruction is connected downstream of the third hot water supply device 2C, then the third hot water supply device 2C only relays communication downstream of the third hot water supply device 2C, such that the mobile terminal 100 and the one of the plurality of hot water supply devices 2 designated in the designation instruction may communicate. Alternatively, when the one of the plurality of hot water supply devices 2 that is designated in the designation instruction is connected upstream of the third hot water supply device 2C, then the third hot water supply device 2C only relays communication upstream of the third hot water supply device 2C, such that the mobile terminal 100 and the one of the plurality of hot water supply devices 2 designated in the designation instruction may communicate.

For example, when the designation instruction designated the sixth hot water supply device 2F as the hot water supply device 2 that the mobile terminal 100 has designated to communicate with, then the third hot water supply device 2C only relays communication upstream of the third hot water supply device 2C, such that the mobile terminal 100 and the one of the plurality of hot water supply devices 2F designated in the designation instruction may communicate. Alternatively, when the designation instruction designated the second hot water supply device 2B as the hot water supply device 2 that the mobile terminal 100 has designated to communicate with, then the third hot water supply device 2C only relays communication downstream of the third hot water supply device 2C, such that the mobile terminal 100 and the one of the plurality of hot water supply devices 2B designated in the designation instruction may communicate. In this way, power may be saved by the hot water supply system 1 since the data is only transmitted to one of the upstream side or the downstream side in which the designated hot water supply device is located, and data is not transmitted to an other of the upstream side or the downstream side in which the designated hot water supply device is not located.

Referring to FIG. 22, a side of the first hot water supply device 2A is referred to as upstream, while a side of the sixth hot water supply device 2F is referred to as downstream. However, the disclosure is not limited thereto, and the "upstream" side and "downstream" side may be set according to requirements. For example, in another embodiment of the disclosure, a side of the first hot water supply device 2A is referred to as downstream, while a side of the sixth hot water supply device 2F is referred to as upstream.

Referring to FIG. 21 and FIG. 22, the mobile terminal 100 may be configured not to pair with any hot water supply device 2 which has an RSSI value below or equal to a predetermined value. The predetermined RSSI value may be for example 80 dbm. In this way, the mobile terminal 100 may avoid pairing with a hot water supply device 2 located at a further location, such that the signal may be improved.

Figure 23:
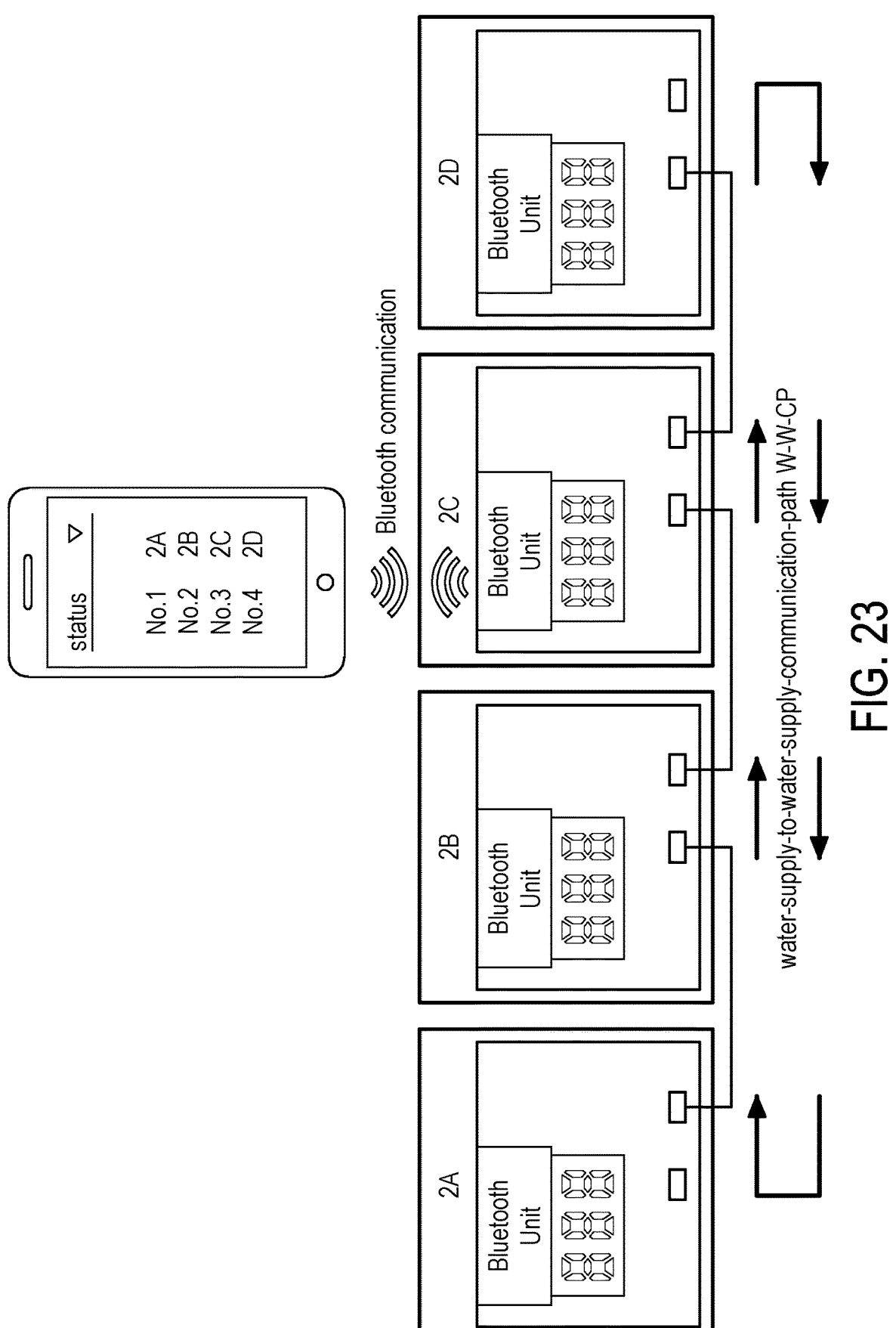
FIG. 23 is a schematic diagram illustrating a mobile terminal connected to a hot water supply system according to an embodiment of the disclosure.

FIG. 23 is a schematic diagram illustrating a mobile terminal connected to a hot water supply system according to an embodiment of the disclosure. Referring to FIG. 23, once the mobile terminal 100 is paired with at least one of the hot water supply devices 2, the mobile terminal 100 is connected to the hot water supply system 1, and the mobile terminal 100 may display a list of all of the hot water supply devices 2 of the hot water supply system 1. Then, the user may select any hot water supply device 2 to obtain/receive data of any individual hot water supply device 2 in the hot water supply system 1.

Figure 24:
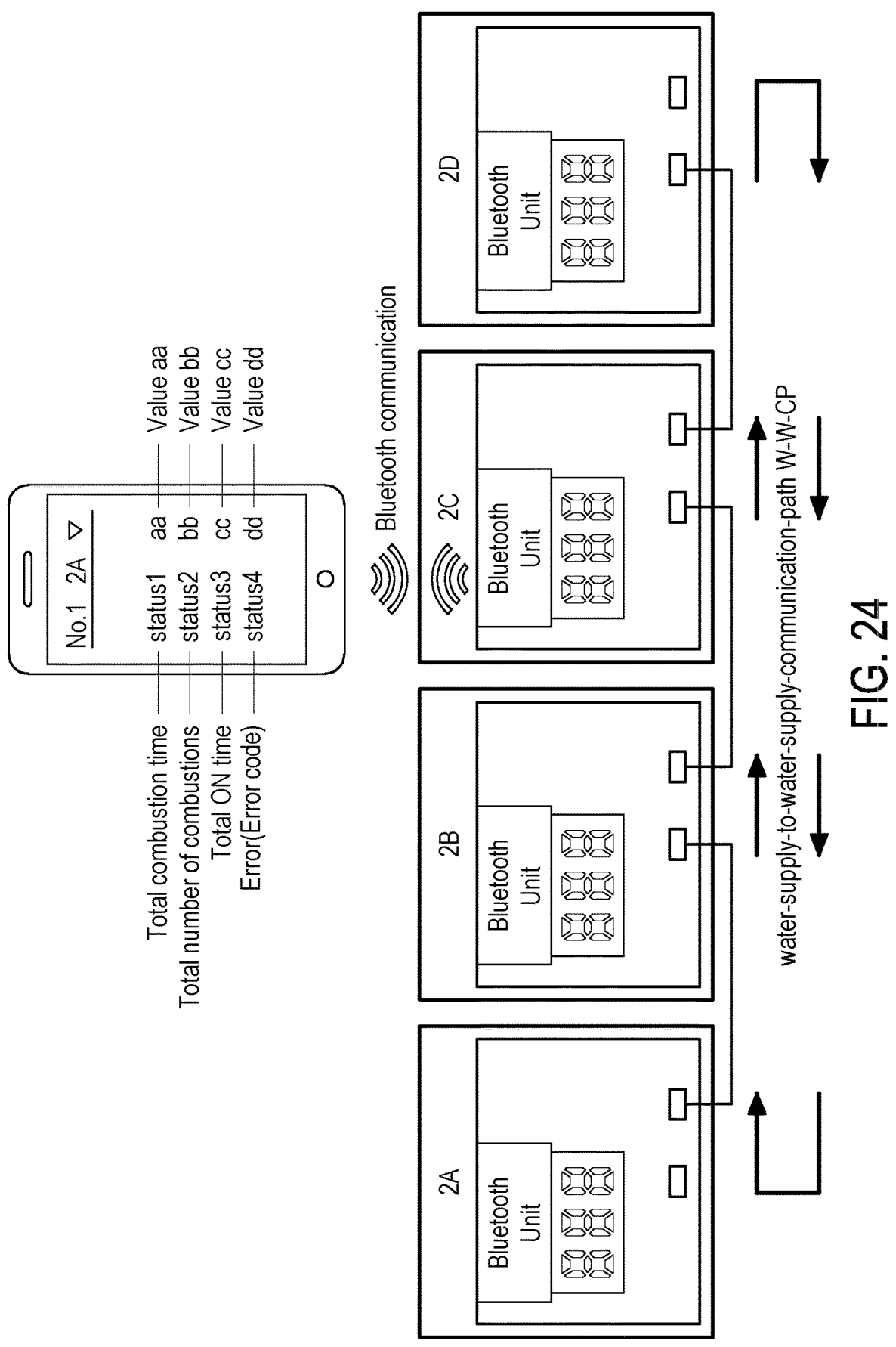
FIG. 24 is a schematic diagram illustrating a mobile terminal obtaining/receiving data of an individual hot water supply device according to an embodiment of the disclosure.

FIG. 24 is a schematic diagram illustrating a mobile terminal obtaining/receiving data of an individual hot water supply device according to an embodiment of the disclosure. Referring to FIG. 24, when the user selects the first host water supply device 2A, the mobile terminal 100 may display the (for example, a total combustion time, a total number of combustions, a total ON time, any errors) of the first hot water supply device 2A. The data that may be displayed on the mobile terminal 100 is not limited thereto, and may be set according to requirements. In addition, the mobile terminal may be used to change/set any settings of any hot water supply device 2, and/or command any hot water supply device 2 to perform any tasks.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hot water supply system, comprising:
a plurality of hot water supply devices, comprising:
a first hot water supply device, comprising:
a first hot water supply wireless communication module, comprising a transceiver and a receiver;
a second hot water supply device, comprising:
a second hot water supply wireless communication module, comprising a transceiver and a receiver;
wherein the plurality of hot water supply devices communicate with each other by a daisy chain connection,
wherein the daisy chain connection is a wireless connection,
wherein one hot water supply device among the plurality of hot water supply devices is configured to be paired with another hot water supply device among the plurality of hot water supply devices that is currently not paired with any of the plurality of hot water supply devices and has a highest received signal strength indicator value among the plurality of hot water supply devices.

2. The hot water supply system according to claim 1,
wherein each of the plurality of hot water supply devices that is currently paired with any hot water supply device among the plurality of hot water supply devices, is configured to display on a display part of each of the plurality of hot water supply devices an indicator indicating that pairing is complete,
wherein the display part comprises at least one of a display or a light.

3. The hot water supply system according to claim 2,
wherein the display part of each of the plurality of hot water supply devices that is currently paired with any hot water supply device is configured to display a total number of hot water supply devices that have completed pairing.

4. The hot water supply system according to claim 1, further comprising:
a mobile terminal, comprising:
a mobile terminal wireless communication module, comprising a transceiver and a receiver;
a display part, including a display;
wherein at least one of the plurality of hot water supply devices is configured to communicate with the mobile terminal,
wherein the mobile terminal is configured to display a total number of hot water supply devices that have completed pairing.

5. The hot water supply system according to claim 2, further comprising:
a mobile terminal, comprising:
a mobile terminal wireless communication module, comprising a transceiver and a receiver;
a display part, including a display;
wherein at least one of the plurality of hot water supply devices is configured to communicate with the mobile terminal,
wherein the mobile terminal is configured to display a total number of hot water supply devices that have completed pairing.

6. The hot water supply system according to claim 1, wherein the one hot water supply device is configured to display on a display, only a single hot water supply device for wireless pairing, wherein the single hot water supply device has the highest received signal strength indicator value among the plurality of hot water supply devices and the single hot water supply device is currently not paired with any of the plurality of hot water supply devices.

7. The hot water supply system according to claim 1, wherein the plurality of hot water supply devices further comprises:
a third hot water supply device, comprising:
a third hot water supply wireless communication module, comprising a transceiver and receiver.

8. The hot water supply system according to claim 1, wherein each one of the plurality of hot water supply devices comprises:

an inlet pipe;

an outlet pipe;

a heat exchanger, comprising a heat exchange tubing adapted to exchange heat;

a processor.

* * * * *